(12) United States Patent
Yang

(10) Patent No.: US 8,553,073 B2
(45) Date of Patent: *Oct. 8, 2013

(54) PROCESSING MULTIVIEW VIDEO

(75) Inventor: Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,354

(22) Filed: Jan. 23, 2012

(65) Prior Publication Data

US 2012/0121015 A1    May 17, 2012

Related U.S. Application Data

(63) Continuation of application No. 11/622,681, filed on Jan. 12, 2007, now Pat. No. 8,115,804.

(60) Provisional application No. 60/758,234, filed on Jan. 12, 2006, provisional application No. 60/759,620, filed on Jan. 18, 2006, provisional application No. 60/762,534, filed on Jan. 27, 2006, provisional application No. 60/787,193, filed on Mar. 30, 2006, provisional application No. 60/818,274, filed on Jul. 5, 2006, provisional application No. 60/830,087, filed on Jul. 12, 2006, provisional application No. 60/830,328, filed on Jul. 13, 2006.

(30) Foreign Application Priority Data

| Jan. 17, 2006 | (KR) | 10-2006-0004956 |
| Mar. 24, 2006 | (KR) | 10-2006-0027110 |
| Apr. 26, 2006 | (KR) | 10-2006-0037773 |
| Nov. 9, 2006 | (KR) | 10-2006-0110337 |
| Nov. 9, 2006 | (KR) | 10-2006-0110338 |

(51) Int. Cl.
*H04N 13/00* (2006.01)

(52) U.S. Cl.
USPC ........... 348/47; 348/211.11; 348/211.3; 348/231.2; 348/143; 375/240.03; 375/240.12

(58) Field of Classification Search
USPC ............... 348/47, 143, 211.11, 211.3, 231.2; 382/233, 238
See application file for complete search history.

(56) References Cited

U.S. PATENT DOCUMENTS

| 6,055,012 A | 4/2000 | Haskell et al. |
| 6,438,169 B1 | 8/2002 | Takashima et al. |

(Continued)

FOREIGN PATENT DOCUMENTS

| CN | 1242907 | 1/2000 |
| CN | 1482802 | 3/2004 |

(Continued)

OTHER PUBLICATIONS

Office Action cited in U.S. Appl. No. 12/309,225 dated Mar. 9, 2012; 11 pages.

(Continued)

*Primary Examiner* — Yves Dalencourt
(74) *Attorney, Agent, or Firm* — Fish & Richardson P.C.

(57) ABSTRACT

Decoding a multiview video signal comprises: receiving a bitstream comprising encodings of multiple views of the multiview video signal, each view comprising multiple pictures segmented into multiple segments; and obtaining a predictor for illumination compensation of a first segment with respect to a reference picture using an offset value for illumination compensation of at least one neighboring segment adjacent to the first segment according whether the reference picture associated with the first segment is the same as a reference picture associated with the neighboring segment.

8 Claims, 25 Drawing Sheets

(56) References Cited

U.S. PATENT DOCUMENTS

| | | | |
|---|---|---|---|
| 6,999,513 B2 | 2/2006 | Sohn et al. | |
| 7,286,689 B2 | 10/2007 | Damera-Venkata et al. | |
| 7,444,664 B2 | 10/2008 | Lou et al. | |
| 7,613,344 B2 | 11/2009 | Kim et al. | |
| 7,671,893 B2 | 3/2010 | Li et al. | |
| 7,710,462 B2 | 5/2010 | Xin et al. | |
| 7,728,878 B2 | 6/2010 | Yea et al. | |
| 7,817,865 B2 * | 10/2010 | Yang | 382/233 |
| 7,817,866 B2 * | 10/2010 | Yang | 382/233 |
| 7,831,102 B2 * | 11/2010 | Yang | 382/233 |
| 7,856,148 B2 * | 12/2010 | Yang | 382/238 |
| 7,970,221 B2 * | 6/2011 | Yang | 382/233 |
| 2003/0202592 A1 | 10/2003 | Sohn et al. | |
| 2004/0247159 A1 | 12/2004 | Damera-Venkata et al. | |
| 2006/0029137 A1 | 2/2006 | Lee et al. | |
| 2006/0132610 A1 | 6/2006 | Xin et al. | |
| 2006/0133493 A1 | 6/2006 | Cho et al. | |
| 2006/0133501 A1 | 6/2006 | Lee et al. | |
| 2006/0146141 A1 | 7/2006 | Xin et al. | |
| 2006/0146143 A1 | 7/2006 | Xin et al. | |
| 2007/0064800 A1 | 3/2007 | Ha | |
| 2007/0071107 A1 | 3/2007 | Ha | |
| 2009/0168874 A1 | 7/2009 | Su et al. | |
| 2009/0237516 A1 | 9/2009 | Jayachandra et al. | |
| 2009/0257669 A1 | 10/2009 | Kim et al. | |
| 2010/0118942 A1 | 5/2010 | Pandit et al. | |
| 2010/0135388 A1 | 6/2010 | Pandit et al. | |
| 2010/0165077 A1 | 7/2010 | Yin et al. | |
| 2010/0215100 A1 | 8/2010 | Jeon et al. | |
| 2010/0329347 A1 | 12/2010 | Kim et al. | |

FOREIGN PATENT DOCUMENTS

| | | |
|---|---|---|
| CN | 1545808 | 10/2004 |
| CN | 1515550 | 3/2005 |
| CN | 101375594 | 9/2011 |
| EP | 1418762 | 5/2004 |
| EP | 1515550 | 3/2005 |
| JP | 6098312 | 4/1994 |
| JP | 2003-517743 | 5/2003 |
| JP | 2005510187 | 4/2005 |
| JP | 2007159113 | 6/2007 |
| KR | 2002-0032954 | 5/2002 |
| KR | 10-0375708 | 2/2003 |
| KR | 1020040013540 | 12/2004 |
| KR | 1020050122717 | 12/2005 |
| KR | 10-0679740 | 1/2007 |
| WO | WO2005/001772 | 1/2005 |
| WO | WO 2005/018217 | 2/2005 |
| WO | WO 2005/069630 | 7/2005 |
| WO | WO2006/001653 | 1/2006 |
| WO | WO 2006/014057 | 2/2006 |
| WO | WO 2006/062377 | 6/2006 |

OTHER PUBLICATIONS

Hangzhou: "wftp3.itu.int-/av-arch/jvt-site/2006_10_Hangzhou/" Intenet Citation, pp. 1-2, XP007916683, Retrieved from the Internet: URL: http://wftp3.itu.int/av-arch/jvtsite/2006_10_Hangzhou/ [retrieved on Jan. 11, 2011].

Kim, Jae Hoon et al., "Dependent Bit Allocation in Multiview Video Coding." IEEE International Conference on Genova, Italy, Sep. 11-14, 2005, Piscataway, NJ, USA, vol. 2, pp. 293-296.

Kim, Yongtae et al., "Fast Disparity and Motion Estimation for Multi-view Video Coding." IEEE Transactions on Consumer Electronics, vol. 53, No. 2, May 2007, pp. 712-719.

Kim, Sang Hyun et al., "Fast local motion-compensation algorithm for video sequences with brightness variations", IEEE Transactions on Circuits and Systems for Video Technology, Publication Date: Apr. 2003, vol. 13, Issue: 4, pp. 289-299.

Kimata, Hideaki et al., "Free-viewpoint Video Communication Using Multi-view Video Coding", NTT Technical Review Online, Aug. 2004 vol. 2 No. 8, 3-D Display and Information Technologies.

Kimata, H. et al, "Hierarchical reference picture selection method for temporal scalability beyond H.264" In Proceedings of International Conference on Multimedia & Expo, pp. 181-184, Jun. 2004.

Koo, Han-Suh et al., "AHG Report: MVC motion/disparity vector coding." Joint Video Team (JVT) of ISO/IEC MPEG & ITU-T VCEG (ISO/IEC JTC1/SC29/WG11 and ITU-T SG16 Q.6), 23$^{rd}$ Meeting: San Jose, California, USA, Apr. 21-27, 2007, Document: JVT-W012, 4 pages.

Koo, Han-Suh et al., "CE11: MVC Motion Skip Mode." Joint Video Team (JVT) of ISO/IEC MPEG & ITU-T SG16 Q.6), 22$^{nd}$ Meeting: Marrakech, Morocco, Jan. 13-19, 2007, Document: JVT-V069.

Koo, Han-Suh et al., "Core Experiment on Disparity and Motion Vector Coding (CE11)." Joint Video Team (JVT) of ISO/IEC MPEG & ITU-T VCEG (ISO/IEC JTC1/SC29/WG11 and ITU-T SG16 Q.6), 21$^{st}$ Meeting: Hangzhou, China, Oct. 20-27, 2006, Document: JVT-U311, 3 pages.

Koo, Han-Suh et al., "Motion Skip Mode for MVC." Joint Video Team (JVT) of ISO/IEC MPEG & ITU-T VCEG (ISO/IEC JTC1/SC29/WG11 and ITU-T SG16 Q.6), 21$^{st}$ Meeting: Hangzhou, China, Oct. 23-27, 2006, Document: JVT-U091-L, 7 pages.

Koo, Han-Suh et al., "MVC Motion Skip Mode." Joint Video Team (JVT) of ISO/IEC MPEG & ITU-T VCEG (ISO/IEC JTC1/SC29/WG11 and ITU-T SG16 Q.6), 23rd Meeting: San Jose, California, USA, Apr. 21-27, 2007, Document: JVT-W081, 13 pages.

Lee, Sang-Heon et al., "Inter-view motion information prediction method in MVC," *Joint Video Team (JVT) of ISO/IEC MPEG & ITU-T VCEG (ISO/IEC JTC1/SC29/WG11 and ITU-T SG16 Q.6) 20$^{th}$ Meeting*: Klagenfurt, Austria, Jul. 15-21, 2006, Document: JVT-T135, Filename: JVT-T135.doc, 13 pages.

Lee, Yung-Lyul et al., "Multi-view Video Coding Using Illumination Change-Adaptive Motion Estimation and 2-D Direct Mode." PCM 2005, Part I, LNCS 3767, Jan. 1, 2005, Springer-Verlag Berlin Heidelberg, Germany, 2005, pp. 396-407.

Lee, Yung-Lyul et al., "Result of CE2 on Multi-view Video Coding." International Organization for Standardization, ISO/IEC JTC1/SC29/WG11, MPEG2006/M13143, Jan. 2006, Switzerland, Montreux, pp. 1-12.

Li, Shiping et al., "Approaches to H.264-Based Stereoscopic Coding." Proceedings of the Third International Conference on Image and Graphics (ICIG'04), Dec. 18-20, 2004, pp. 365-368.

Lopez, Joaquin et al., "Block-based Illumination Compensation and Search Techniques for Multiview Video Coding," *Picture Coding Symposium*, San Francisco, CA, Dec. 2004.

Merkle, P. et al., "Efficient Compression of Multi-View Video Exploiting Inter-View Dependencies Based on H.264/MPEG4-AVC", In Proceedings of International Conference on Multimedia & Expo, pp. 2161-2164, Jul. 2006.

Non-final Office Action issued in U.S. Appl. No. 11/622,675, mailed May 25, 2011, 9 pages.

Non-final Office Action issued in U.S. Appl. No. 11/622,709, mailed Jul. 11, 2011, 9 pages.

Non-final Office Action issued in U.S. Appl. No. 11/622,675 dated Oct. 13, 2011, 18 pages.

Notice of Allowance issued in U.S. Appl. No. 11/622,709 dated Dec. 5, 2011, 8 pages.

Ohm, Jens-Rainer, "Stereo/Multiview Video Encoding Using the MPEG Family of Standards." Part of the IS&T/SPIE Conference on Stereoscopic Displays and Applications X, San Jose, California, Jan. 1998, SPIE vol. 3639, pp. 242-253.

Search Report issued in EP application No. 07 768 721.8, dated Sep. 3, 2010, 5 pages.

Senoh, Taka et al., "Disparity Vector Prediction CE Plan for MVC/CE4." *International Organisation for Standardisation, ISO/IEC JTC1/SC29/WG11*, No. M13166, Montreux, Switzerland, Apr. 2006, 6 pages.

Smolic, A. et al., "3D Video and Free Viewpoint Video—Technologies, Applications and MPEG Standards", In Proceedings of International Conference on Multimedia & Expo, pp. 2161-2164, Jul. 2006.

Smolic, A. et al., "Development of MPEG Standards for 3D and Free Viewpoint Video", SPIE Conference Optics East 2005: Communications, Multimedia & Display Technologies, vol. 6014, pp. 262-273, Nov. 2005.

Smolic, A. et al., "Interactive 3-D video representation and coding technologies" Proceedings of the IEEE, Publication Date: Jan. 2005, vol. 93, Issue: 1, pp. 98-110.

Song, Hak-Sup et al., "Macroblock Information Skip for MVC." Joint Video Team (JVT) of ISO/IEC MPEG & ITU-T VCEG (ISO/IEC JTC1/SC29/WG11 and ITU-T SG16 Q.6), 22$^{nd}$ Meeting: Marrakech, Morocco, Jan. 13-19, 2007, Document: JVT-V052r1, 7 pages.

Supplementary European Search Report issued in European Application No. EP 07768721, mailed Feb. 2, 2010, 3 pages.

Supplementary European Search Report issued in application No. EP07700952, dated May 18, 2010, 9 pages.

Supplementary European Search Report issued in application No. EP07700955, dated May 18, 2010, 10 pages.

Taiwanese Search Report, Taiwan Advance Patent & Trademark Office, issued in application No. 096125507, dated Nov. 1, 2010, 2 pages.

Notice of Allowance issued in U.S. Appl. No. 11/622,611, dated Apr. 30, 2010, 8 pages.

Non-final Office Action in U.S. Appl. No. 11/622,803, dated Oct. 21, 2010, 24 pages.

Yang, Wenxian et al., "Scalable multiview video coding using wavelet" Nanyang Technol. Univ., Singapore; IEEE International Symposium on Circuits and Systems, May 2005.

Zhu, Gang et al., "Inter-view Direct Mode in MVC." *International Organisation for Standardisation, ISO/IEC JTC1/SC29/WG11*, No. MPEG2006/m13177, Montreux, Switzerland, Apr. 2006, 5 pages.

Non-final Office Action issued in U.S. Appl. No. 11/622,681, mailed Jun. 20, 2011, 9 pages.

Yung-Lyul Lee et al: "Result of CE2 on Multi-view Video Coding" 77. MPEG Meeting; Jul. 17-21, 2006; Klagenfurt; (Motion Picture Expert Group or ISO/IEC JTC1/SC29/WG11), No. M13498, Jul. 12, 2006, XP030042167.

"Advanced video coding for generic audiovisual services; H.264 (05/03)," ITU-T Standard Superseded(s), International Telecommunication Union, Geneva, CH, No. H.264 (05/03), May 30, 2003, pp. 110-123.

"Description of Core Experiments in MVC." *International Organisation for Standardisation, ISO/IEC JTC1/SC29/WG11*, No. MPEG2006/W8019, Montreux, Switzerland, Apr. 2006, 38 pages.

Examination Report, European Patent Office, EP Application No. 07 768 721.8, dated Jan. 20, 2011, 7 pages.

Hangzhou: "wftp3.itu.int-/av-arch/jvt-site/2006_10_Hangzhou/" Intent Citation, pp. 1-2, XP007916683, Retrieved from the Internet: URL: http://wftp3.itu.int/av-arch/jvtsite/2006_10_Hangzhou/ [retrieved on Jan. 11, 2011].

ISO/IEC JTC1/SC29/WG11, "Survey of Algorithms used for Multi-view Video Coding (MVC)", Doc. N6909, Hong Kong, China, Jan. 2005.

Kauff, P. et al., "Data Format and Coding for Free Viewpoint Video," Proc. International Broadcast Convention IBC 2005, Amsterdam, Netherlands, pp. , Sep. 2005.

Kim, Jae Hoon et al., "Dependent Bit Allocation in Multiview Video Coding." IEEE International Conference on Genova, Italy, Sep. 11-14, 2005, Piscataway, NJ, USA, vol. 2, Sep. 11, 2005, pp. 293-296.

Notice of Allowance issued by the Chinese Patent Office for Application No. 200780003083.8 dated Mar. 5, 2013 (with English translation) 6 pages.

* cited by examiner

FIG. 5

| $h_0$ | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ |
|---|---|---|---|---|---|---|---|---|---|---|---|---|---|---|---|---|
| $v_1$ | | | | | | | | | | | | | | | | |
| $v_2$ | | | | | | | | | | | | | | | | |
| $v_3$ | | | | | | | | | | | | | | | | |
| $v_4$ | | | | | | | | | | | | | | | | |
| $v_5$ | | | | | | | | | | | | | | | | |
| $v_6$ | | | | | | | | | | | | | | | | |
| $v_7$ | | | | | | | | | | | | | | | | |
| $v_8$ | | | | | | | | B16X16 | | | | | | | | |
| $v_9$ | | | | | | | | | | | | | | | | |
| $v_{10}$ | | | | | | | | | | | | | | | | |
| $v_{11}$ | | | | | | | | | | | | | | | | |
| $v_{12}$ | | | | | | | | | | | | | | | | |
| $v_{13}$ | | | | | | | | | | | | | | | | |
| $v_{14}$ | | | | | | | | | | | | | | | | |
| $v_{15}$ | | | | | | | | | | | | | | | | |
| $v_{16}$ | | | | | | | | | | | | | | | | |

FIG. 6A

| $h_0$ | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ |
|---|---|---|---|---|---|---|---|---|---|---|---|---|---|---|---|---|

| $h_0$ | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ |
|---|---|---|---|---|---|---|---|---|---|---|---|---|---|---|---|---|
| $v_1$ | | | | | | | | | | | | | | | | |
| $v_2$ | | | | | | | | | | | | | | | | |
| $v_3$ | | | | | | | | | | | | | | | | |
| $v_4$ | | | | | | | | | | | | | | | | |
| $v_5$ | | | | | | | | | | | | | | | | |
| $v_6$ | | | | | | | | | | | | | | | | |
| $v_7$ | | | | | | | | | | | | | | | | |
| $v_8$ | | | | B8X16_0 | | | | | | | | B8X16_1 | | | | |
| $v_9$ | | | | | | | | | | | | | | | | |
| $v_{10}$ | | | | | | | | | | | | | | | | |
| $v_{11}$ | | | | | | | | | | | | | | | | |
| $v_{12}$ | | | | | | | | | | | | | | | | |
| $v_{13}$ | | | | | | | | | | | | | | | | |
| $v_{14}$ | | | | | | | | | | | | | | | | |
| $v_{15}$ | | | | | | | | | | | | | | | | |
| $v_{16}$ | | | | | | | | | | | | | | | | |

FIG. 7B

| $h_0$ | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ |
|---|---|---|---|---|---|---|---|---|---|---|---|---|---|---|---|---|
| $v_1$ | | | | | | | | $y_1$ | | | | | | | | |
| $v_2$ | | | | | | | | $y_2$ | | | | | | | | |
| $v_3$ | | | | | | | | $y_3$ | | | | | | | | |
| $v_4$ | | | | | | | | $y_4$ | | | | | | | | |
| $v_5$ | | | | | | | | $y_5$ | | | | | | | | |
| $v_6$ | | | | | | | | $y_6$ | | | | | | | | |
| $v_7$ | | | B8X16_0 | | | | | $y_7$ | | | | B8X16_1 | | | | |
| $v_8$ | | | | | | | | $y_8$ | | | | | | | | |
| $v_9$ | | | | | | | | $y_9$ | | | | | | | | |
| $v_{10}$ | | | | | | | | $y_{10}$ | | | | | | | | |
| $v_{11}$ | | | | | | | | $y_{11}$ | | | | | | | | |
| $v_{12}$ | | | | | | | | $y_{12}$ | | | | | | | | |
| $v_{13}$ | | | | | | | | $y_{13}$ | | | | | | | | |
| $v_{14}$ | | | | | | | | $y_{14}$ | | | | | | | | |
| $v_{15}$ | | | | | | | | $y_{15}$ | | | | | | | | |
| $v_{16}$ | | | | | | | | $y_{16}$ | | | | | | | | |

| $h_0$ | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | $h_{14}$ | $h_{15}$ | $h_{16}$ |
|---|---|---|---|---|---|---|---|---|---|---|---|---|---|---|---|---|
| $v_1$ | | | | | | | | $y_1$ | | | | | | | | |
| $v_2$ | | | | | | | | $y_2$ | | | | | | | | |
| $v_3$ | | | | | | | | $y_3$ | | | | | | | | |
| $v_4$ | | | B8X8_0 | | | | | $y_4$ | | | | B8X8_1 | | | | |
| $v_5$ | | | | | | | | $y_5$ | | | | | | | | |
| $v_6$ | | | | | | | | $y_6$ | | | | | | | | |
| $v_7$ | | | | | | | | $y_7$ | | | | | | | | |
| $v_8$ | $g_1$ | $g_2$ | $g_3$ | $g_4$ | $g_5$ | $g_6$ | $g_7$ | $y_8$ | $g_9$ | $g_{10}$ | $g_{11}$ | $g_{12}$ | $g_{13}$ | $g_{14}$ | $g_{15}$ | $g_{16}$ |
| $v_9$ | | | | | | | | $y_9$ | | | | | | | | |
| $v_{10}$ | | | | | | | | $y_{10}$ | | | | | | | | |
| $v_{11}$ | | | | | | | | $y_{11}$ | | | | | | | | |
| $v_{12}$ | | | B8X8_2 | | | | | $y_{12}$ | | | | B8X8_3 | | | | |
| $v_{13}$ | | | | | | | | $y_{13}$ | | | | | | | | |
| $v_{14}$ | | | | | | | | $y_{14}$ | | | | | | | | |
| $v_{15}$ | | | | | | | | $y_{15}$ | | | | | | | | |
| $v_{16}$ | | | | | | | | $y_{16}$ | | | | | | | | |

PROCESSING MULTIVIEW VIDEO

CROSS-REFERENCE TO RELATED APPLICATIONS

This application is a continuation of U.S. application Ser. No. 11/622,681, filed on Jan. 12, 2007 and issued as U.S. Pat. No. 8,115,804 on Feb. 14, 2012, which claims the benefit of U.S. Application Ser. No. 60/758,234 filed on Jan. 12, 2006, U.S. Application Ser. No. 60/759,620 filed on Jan. 18, 2006, U.S. Application Ser. No. 60/762,534 filed on Jan. 27, 2006, U.S. Application Ser. No. 60/787,193 filed on Mar. 30, 2006, U.S. Application Ser. No. 60/818,274 filed on Jul. 5, 2006, U.S. Application Ser. No. 60/830,087 filed on Jul. 12, 2006, U.S. Application Ser. No. 60/830,328 filed on Jul. 13, 2006, Korean Application No. 10-2006-0004956 filed on Jan. 17, 2006, Korean Application No. 10-2006-0027100 filed on Mar. 24, 2006, Korean Application No. 10-2006-0037773 filed on Apr. 26, 2006, Korean Application No. 10-2006-0110337 filed on Nov. 9, 2006, and Korean Application No. 10-2006-0110338 filed on Nov. 9, 2006, each of which is incorporated herein by reference.

BACKGROUND

The invention relates to processing multiview video.

Multiview Video Coding (MVC) relates to compression of video sequences (e.g., a sequence of images or "pictures") that are typically acquired by respective cameras. The video sequences or "views" can be encoded according to a standard such as MPEG. A picture in a video sequence can represent a full video frame or a field of a video frame. A slice is an independently coded portion of a picture that includes some or all of the macroblocks in the picture, and a macroblock includes blocks of picture elements (or "pixels").

The video sequences can be encoded as a multiview video sequence according to the H.264/AVC codec technology, and many developers are conducting research into amendment of standard is to accommodate multiview video sequences.

Three profiles for supporting specific functions are prescribed in the current H.264 standard. The term "profile" indicates the standardization of technical components for use in the video encoding/decoding algorithms. In other words, the profile is the set of technical components prescribed for decoding a bitstream of a compressed sequence, and may be considered to be a sub-standard. The above-mentioned three profiles are a baseline profile, a main profile, and an extended profile. A variety of functions for the encoder and the decoder have been defined in the H.264 standard, such that the encoder and the decoder can be compatible with the baseline profile, the main profile, and the extended profile respectively.

The bitstream for the H.264/AVC standard is structured according to a Video Coding Layer (VCL) for processing the moving-image coding (i.e., the sequence coding), and a Network Abstraction Layer (NAL) associated with a subsystem capable of transmitting/storing encoded information. The output data of the encoding process is VCL data, and is mapped into NAL units before it is transmitted or stored. Each NAL unit includes a Raw Byte Sequence Payload (RBSP) corresponding to either compressed video data or header information.

The NAL unit includes a NAL header and a RBSP. The NAL header includes flag information (e.g., nal_ref_idc) and identification (ID) information (e.g., nal_unit_type). The flag information "nal_ref_idc" indicates the presence or absence of a slice used as a reference picture of the NAL unit. The ID information "nal_unit_type" indicates the type of the NAL unit. The RBSP stores compressed original data. An RBSP trailing bit can be added to the last part of the RBSP, such that the length of the RBSP can be represented by a multiple of 8 bits.

There are a variety of the NAL units, for example, an Instantaneous Decoding Refresh (IDR) picture, a Sequence Parameter Set (SPS), a Picture Parameter Set (PPS), and Supplemental Enhancement Information (SEI), etc.

The standard has generally defined a target product using various profiles and levels, such that the target product can be implemented with appropriate costs. The decoder satisfies a predetermined constraint at a corresponding profile and level.

The profile and the level are able to indicate a function or parameter of the decoder, such that they indicate which compressed images can be handled by the decoder. Specific information indicating which one of multiple profiles corresponds to the bitstream can be identified by profile ID information. The profile ID information "profile_idc" provides a flag for identifying a profile associated with the bitstream. The H.264/AVC standard includes three profile identifiers (IDs). If the profile ID information "profile_idc" is set to "66", the bitstream is based on the baseline profile. If the profile ID information "profile_idc" is set to "77", the bitstream is based on the main profile. If the profile ID information "profile_idc" is set to "88", the bitstream is based on the extended profile. The above-mentioned "profile_idc" information may be contained in the SPS (Sequence Parameter Set), for example.

SUMMARY

In one aspect, in general, a method for decoding a multiview video signal comprises: receiving a bitstream comprising encodings of multiple views of the multiview video signal, each view comprising multiple pictures segmented into multiple segments (e.g., an image block segment such as a single block or a macroblock, or a segment such as a slice of an image); extracting flag information associated with a portion of the multiview video signal from the bitstream indicating whether illumination compensation of segments within said portion of the multiview video signal is enabled; and for a portion in which illumination compensation is enabled according to the extracted flag information, extracting from the bitstream a value associated with a segment within the portion and determining from said extracted value whether illumination compensation of the segment is to be performed.

Aspects can include one or more of the following features.

The segments comprise image blocks.

The method further comprises, for a first block associated with a value that indicates that illumination compensation is to be performed, obtaining a predictor for performing illumination compensation of the first block using an offset value for illumination compensation of at least one neighboring block adjacent to the first block.

An offset value for illumination compensation of a neighboring block is obtained by forming a sum that includes a predictor for illumination compensation of the neighboring block and a residual value.

Obtaining a predictor for illumination compensation of the first block using an offset value for illumination compensation of at least one neighboring block adjacent to the first block includes selecting the at least one neighboring block according to a predetermined order among the neighboring blocks.

Selecting the at least one neighboring block according to the predetermined order comprises determining whether one or more conditions are satisfied for a neighboring block in an order in which one or more vertical or horizontal neighbors are followed by one or more diagonal neighbors.

The flag information enables illumination compensation for one or more of a sequence, a view, a group of pictures, a picture, and a slice that contains the block.

The flag information enables illumination compensation for the slice that contains the block.

The extracted value comprises flag information for a macroblock that contains the block or flag information for the block.

The extracted value comprises flag information for the macroblock that contains the block.

In another aspect, in general, a method for decoding a multiview video signal comprises: receiving a bitstream comprising encodings of multiple views of the multiview video signal, each view comprising multiple pictures segmented into multiple segments; and obtaining a predictor for illumination compensation of a first segment using an offset value for illumination compensation of at least one neighboring segment adjacent to the first segment, including selecting the at least one neighboring segment according to a predetermined order among the neighboring segments.

Aspects can include one or more of the following features.

The first segment and the at least one neighboring segment comprise image blocks.

An offset value for illumination compensation of a neighboring block is obtained by forming a sum that includes a predictor for illumination compensation of the neighboring block and a residual value.

Selecting the at least one neighboring block according to the predetermined order comprises determining whether one or more conditions are satisfied for a neighboring block in an order in which one or more vertical or horizontal neighbors are followed by one or more diagonal neighbors.

Selecting the at least one neighboring block according to the predetermined order comprises determining whether one or more conditions are satisfied for a neighboring block in the order of: a left neighboring block, followed by an upper neighboring block, followed by a right-upper neighboring block, followed by a left-upper neighboring block.

Selecting the at least one neighboring block according to the predetermined order comprises determining whether one or more conditions are satisfied for a neighboring block in the order of: a upper neighboring block, followed by a left neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

The extracted value comprises flag information for a macroblock that contains the block or flag information for the block.

Obtaining the predictor comprises determining whether to use an offset value for illumination compensation of a single neighboring block or multiple offset values for illumination compensation of respective neighboring blocks.

The method further comprises, when multiple offset values are to be used, obtaining the predictor for performing illumination compensation of the first block by combining the multiple offset values.

Combining the multiple offset values comprises taking an average or median of the offset values.

In another aspect, in general, a method for decoding a multiview video signal comprises: receiving a bitstream comprising encodings of multiple views of the multiview video signal, each view comprising multiple pictures segmented into multiple segments; obtaining an offset value for illumination compensation of a first segment with respect to a reference picture, wherein the offset value is predicted using an offset value for illumination compensation of at least one neighboring segment determined based on characteristics associated with the neighboring segment; and decoding the bitstream using illumination compensation for the first segment including forming a sum that includes a predictor for pixels of the first segment obtained from the reference picture, a residual for pixels of the first segment, and a corresponding offset value for illumination compensation.

Aspects can include one or more of the following features.

The first segment and the at least one neighboring segment comprise image blocks.

An offset value for illumination compensation of a neighboring block is obtained by forming a sum that includes a predictor for illumination compensation of the neighboring block and a residual value.

The method further comprises selecting at least one neighboring block based on whether one or more conditions are satisfied for a neighboring block in an order in which one or more vertical or horizontal neighbors are followed by one or more diagonal neighbors.

Selecting at least one neighboring block comprises determining whether one or more conditions are satisfied for a neighboring block in the order of: a left neighboring block, followed by an upper neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

The extracted value comprises flag information for a macroblock that contains the block or flag information for the block.

Selecting at least one neighboring block comprises determining whether to use an offset value for illumination compensation of a single neighboring block or multiple offset values for illumination compensation of respective neighboring blocks.

The method further comprises, when multiple offset values are to be used, obtaining the predictor for performing illumination compensation of the first block by combining the multiple offset values.

Combining the multiple offset values comprises taking an average or median of the offset values.

In another aspect, in general, a method for decoding a multiview video signal, comprises: receiving a bitstream comprising encodings of multiple views of the multiview video signal, each view comprising multiple pictures segmented into multiple segments; obtaining a predictor for illumination compensation of a first segment with respect to a reference picture; determining an offset value for illumination compensation of the first segment including forming a sum that includes the predictor and a residual value; and decoding the bitstream using illumination compensation for the first segment including forming a sum that includes a predictor for pixels of the first segment obtained from the reference picture, a residual for pixels of the first segment, and a corresponding offset value for illumination compensation.

Aspects can include one or more of the following features.

The segments comprise image blocks.

Using illumination compensation for the first segment comprises obtaining an offset value for illumination compensation of a neighboring block by forming a sum that includes a predictor for illumination compensation of the neighboring block and a residual value.

The method further comprises selecting at least one neighboring block based on whether one or more conditions are satisfied for a neighboring block in an order in which one or more vertical or horizontal neighbors are followed by one or more diagonal neighbors.

Selecting at least one neighboring block comprises determining whether one or more conditions are satisfied for a neighboring block in the order of: a left neighboring block, followed by an upper neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

The extracted value comprises flag information for a macroblock that contains the block or flag information for the block.

Selecting at least one neighboring block comprises determining whether to use an offset value for illumination compensation of a single neighboring block or multiple offset values for illumination compensation of respective neighboring blocks.

The method further comprises, when multiple offset values are to be used, obtaining the predictor for performing illumination compensation of the first block by combining the multiple offset values.

Combining the multiple offset values comprises taking an average or median of the offset values.

In another aspect, in general, a method for decoding a multiview video signal comprises: receiving a bitstream comprising encodings of multiple views of the multiview video signal, each view comprising multiple pictures segmented into multiple segments; and obtaining a predictor for illumination compensation of a first segment with respect to a reference picture using an offset value for illumination compensation of at least one neighboring segment adjacent to the first segment according whether the reference picture associated with the first segment is the same as a reference picture associated with the neighboring segment.

Aspects can include one or more of the following features.

The segments comprise image blocks.

Using illumination compensation for the first segment comprises obtaining an offset value for illumination compensation of a neighboring block by forming a sum that includes a predictor for illumination compensation of the neighboring block and a residual value.

The method further comprises selecting at least one neighboring block based on whether one or more conditions are satisfied for a neighboring block in an order in which one or more vertical or horizontal neighbors are followed by one or more diagonal neighbors.

Selecting at least one neighboring block comprises determining whether one or more conditions are satisfied for a neighboring block in the order of: a left neighboring block, followed by an upper neighboring block, followed by a right-upper neighboring block, followed by a left-upper neighboring block.

Determining whether one or more conditions are satisfied for a neighboring block comprises extracting a value associated with the neighboring block from the bitstream indicating whether illumination compensation of the neighboring block is to be performed.

The extracted value comprises flag information for a macroblock that contains the block or flag information for the block.

Selecting at least one neighboring block comprises determining whether to use an offset value for illumination compensation of a single neighboring block or multiple offset values for illumination compensation of respective neighboring blocks.

The method further comprises, when multiple offset values are to be used, obtaining the predictor for performing illumination compensation of the first block by combining the multiple offset values.

Combining the multiple offset values comprises taking an average or median of the offset values.

In another aspect, in general, for each respective decoding method, a method for encoding a video signal comprises generating a bitstream capable of being decoded into the video signal by the respective decoding method.

For example, in another aspect, in general, a method for encoding a bitstream comprises: forming the bitstream comprising encodings of multiple views of the multiview video signal, each view comprising multiple pictures segmented into multiple segments; providing flag information associated with a portion of the multiview video signal in the bitstream indicating whether illumination compensation of segments within said portion of the multiview video signal is enabled; and for a portion in which illumination compensation is enabled according to the extracted flag information, providing in the bitstream a value associated with a segment within the portion and determining from said extracted value whether illumination compensation of the segment is to be performed.

In another aspect, in general, a method for encoding a bitstream comprises: forming the bitstream comprising encodings of multiple views of the multiview video signal, each view comprising multiple pictures segmented into multiple segments; and providing a predictor for illumination compensation of a first segment using an offset value for illumination compensation of at least one neighboring segment adjacent to the first segment, including selecting the at least one neighboring segment according to a predetermined order among the neighboring segments.

In another aspect, in general, a method for encoding a bitstream comprises: forming the bitstream comprising encodings of multiple views of the multiview video signal, each view comprising multiple pictures segmented into multiple segments; providing an offset value for illumination compensation of a first segment with respect to a reference picture, wherein the offset value is able to be predicted using an offset value for illumination compensation of at least one neighboring segment determined based on characteristics associated with the neighboring segment; and providing information for illumination compensation for the first segment based on a sum that includes a predictor for pixels of the first segment obtained from the reference picture, a residual for pixels of the first segment, and a corresponding offset value for illumination compensation.

In another aspect, in general, a method for encoding a bitstream comprises: forming the bitstream comprising encodings of multiple views of the multiview video signal, each view comprising multiple pictures segmented into multiple segments; providing a predictor for illumination compensation of a first segment with respect to a reference picture; providing an offset value for illumination compensation of the first segment based on a sum that includes the predictor and a residual value; and providing information for illumination compensation for the first segment based on a sum that includes a predictor for pixels of the first segment obtained from the reference picture, a residual for pixels of the first segment, and a corresponding offset value for illumination compensation.

In another aspect, in general, a method for encoding a bitstream comprises: forming the bitstream comprising encodings of multiple views of the multiview video signal, each view comprising multiple pictures segmented into multiple segments; and providing a predictor for illumination compensation of a first segment with respect to a reference picture using an offset value for illumination compensation of at least one neighboring segment adjacent to the first segment according whether the reference picture associated with the first segment is the same as a reference picture associated with the neighboring segment.

In another aspect, in general, for each respective decoding method, a computer program, stored on a computer-readable medium, comprises instructions for causing a computer to perform the respective decoding method.

In another aspect, in general, for each respective decoding method, image data embodied on a machine-readable information carrier is capable of being decoded into a video signal by the respective decoding method.

In another aspect, in general, for each respective decoding method, a decoder comprises means for performing the respective decoding method.

In another aspect, in general, for each respective decoding method, an encoder comprises means for generating a bitstream capable of being decoded into a video signal by the respective decoding method.

In another aspect, in general, a method for encoding a video sequence comprises: a) obtaining an average pixel value of at least one block from among neighboring blocks of a current block and reference blocks of another view; b) deriving a predicted average pixel value of the current block from the obtained average pixel value of the at least one block; and c) obtaining a difference value between a predicted average pixel value of the current block and an average pixel value of the current block.

In another aspect, in general, there is provided a method for decoding a video sequence comprising: l) obtaining a difference value capable of reconstructing an average pixel value of a current block from a video signal; m) deriving a predicted average pixel value of the current block from reference blocks of another view; and n) reconstructing the average pixel value of the current block on the basis of the predicted average pixel value and the difference value.

In yet another aspect, in general, there is provided an apparatus for encoding a video sequence comprising: an average pixel value obtaining unit for obtaining average pixel values of neighboring blocks of a current block and reference blocks of another view; an average pixel value prediction unit for deriving a predicted average pixel value of the current block from the obtained average pixel value; and a differential-value encoding unit for obtaining a difference value between the predicted average pixel value and the average pixel value of the current block.

In yet another aspect, in general, there is provided an apparatus for decoding a video sequence comprising: a difference-value decoding unit for obtaining a difference value from a received bitstream; an average pixel value prediction unit for deriving a predicted average pixel value of a current block from a reference block of another view; and an illumination compensation unit for reconstructing the average pixel value of the current block on the basis of the predicted average pixel value and the difference value.

In yet another aspect, in general, a method for decoding a video signal comprises: obtaining a predictor for performing illumination compensation of a current block using an offset value of at least one neighboring block adjacent to the current block; and reconstructing an offset value of the current block using the predictor, wherein the predictor is determined by determining whether a reference index of the current block is equal to a reference index of the neighboring block.

In yet another aspect, in general, there is provided a method for decoding a video signal comprising: reconstructing a current block offset value indicating a difference between an average pixel value of a current block and an average pixel value of at least one reference block; and obtaining respectively an offset values of the reference blocks of the current block using the offset value, if the current block is predictively encoded by two or more reference blocks.

In yet another aspect, in general, a method for decoding a video signal comprises: obtaining flag information indicating whether illumination compensation of a current block is performed; and if the illumination compensation is performed by the flag information, reconstructing an offset value indicating a difference between an average pixel value of the current block and an average pixel value of a reference block.

In yet another aspect, in general, there is provided a method for decoding a video signal comprising: a) obtaining flag information for allowing a specific level of a video signal to be illumination-compensated; and b) decoding a specific level of the video signal illumination-compensated by the flag information, wherein the specific level of the video signal corresponds to any one of a sequence level, a view level, a GOP (Group of Pictures) level, a picture level, a slice level, a macroblock level, and a block level.

In yet another aspect, in general, there is provided a method for encoding a video signal comprising: obtaining a current-block's offset value indicating a difference between an average pixel value of the current block and a reference block; and searching for a reference optimally matched with the current block using the offset value; and obtaining a motion vector from the matched reference block, and encoding the motion vector.

Aspects can have one or more of the following advantages.

The method or apparatus for encoding/decoding a video sequence predicts an average value of a current block to be encoded on the basis of peripheral blocks, and transmits a difference value between the current block and the peripheral blocks, thereby minimizing an amount of information to be transmitted for illumination compensation.

The method effectively performs illumination compensation of a multiview video sequence requiring a large amount of data, thereby increasing an encoding rate. The method implements an effective encoding/decoding system using correlation between blocks or views.

View sequences of the multiview video data are captured by different cameras, such that there is a difference in illumination due to inner or outer factors of the cameras. In order to solve the problems, the method predicts an offset value of a current block using information of the neighboring block, transmits only a residual value between the current block and the neighboring block, such that it can minimize an amount of information to be transmitted for illumination compensation.

In the case of predicting the offset value of the current block, the method determines whether a reference index of the current block is equal to that of the neighboring block, resulting in the implementation of correct prediction.

The method predicts flag information indicating whether the illumination compensation of the current block is performed, and transmits only a residual value between the flag information, thereby minimizing an amount of information to be transmitted. The method determines whether a reference index of the current block is equal to that of the neighboring block, resulting in the implementation of correct prediction. The method uses correlation between blocks or views, resulting in the implementation of the effective coding process.

View sequences of the multiview video data are captured by different cameras, such that there is a difference in illumination due to inner or outer factors of the cameras. In order to solve the above-mentioned problems, the method predicts an offset value of a current block using information of the neighboring block, transmits only a residual value between the current block and the neighboring block, such that it can minimize an amount of information to be transmitted for illumination compensation. The method predicts flag information indicating whether the illumination compensation of the current block is performed, and transmits only a residual value, thereby minimizing an amount of information to be transmitted.

If the predictive coding process is performed using two or more reference blocks, the method employs the offset value and the flag information using at least one method, resulting in the implementation of the effective coding process. A flag bit indicating whether the illumination compensation is performed to each area of the video signal is assigned, such that the illumination compensation technique can be effectively used. The method calculates the costs by reflecting an illumination difference in the motion estimation process, resulting in the implementation of the correct predictive coding.

Other features and advantages will become apparent from the following description, and from the claims.

DESCRIPTION OF DRAWINGS

FIG. 5 is a diagram illustrating a 16×16 macroblock.

FIGS. 6A-6B are diagrams illustrating 16×8 macroblocks.

FIGS. 7A-7B are diagrams illustrating 8×16 macroblocks.

FIGS. 8A-8B are diagrams illustrating 8×8 macroblocks.

DESCRIPTION

In order to effectively handle a multiview sequence, an input bitstream includes information that allows a decoding apparatus to determine whether the input bitstream relates to a multiview profile. In cases that it is determined that the input bitstream relates to the multiview profile, supplementary information associated with the multiview sequence is added according to a syntax to the bitstream and transmitted to the decoder. For example, the multiview profile ID can indicate a profile mode for handling multiview video data as according to an amendment of the H.264/AVC standard.

The MVC (Multiview Video Coding) technology is an amendment technology of the H.264/AVC standards. That is, a specific syntax is added as supplementary information for an MVC mode. Such amendment to support MVC technology can be more effective than an alternative in which an unconditional syntax is used. For example, if the profile identifier of the AVC technology is indicative of a multiview profile, the addition of multiview sequence information may increase a coding efficiency.

The sequence parameter set (SPS) of the H.264/AVC bitstream is indicative of header information including information (e.g., a profile, and a level) associated with the entire-sequence encoding.

Figure 2:
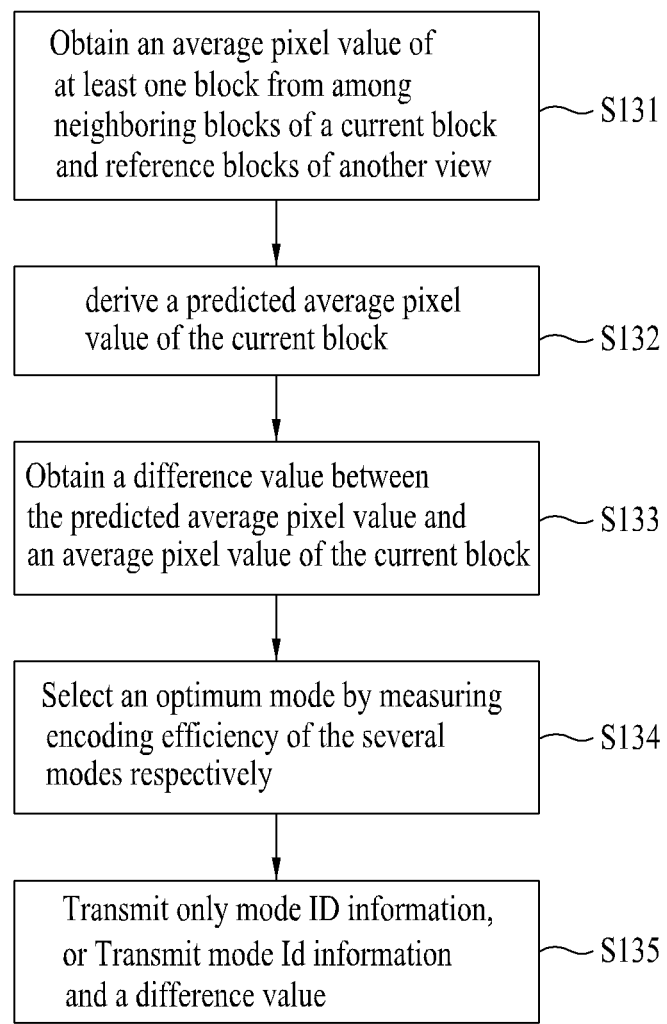
FIG. 2 is a flowchart illustrating a method for encoding a video sequence.

The entire compressed moving images (i.e., a sequence) can begin at a sequence header, such that a sequence parameter set (SPS) corresponding to the header information arrives at the decoder earlier than data referred to by the parameter set. As a result, the sequence parameter set RBSP acts as header information of a compressed data of moving images at entry S1 (FIG. 2). If the bitstream is received, the profile ID information "profile_idc" identifies which one of profiles from among several profiles corresponds to the received bitstream.

The profile ID information "profile_idc" can be set, for example, to "MULTI_VIEW_PROFILE)", so that the syntax including the profile ID information can determine whether the received bitstream relates to a multiview profile. The following configuration information can be added when the received bitstream relates to the multiview profile.

Figure 1:
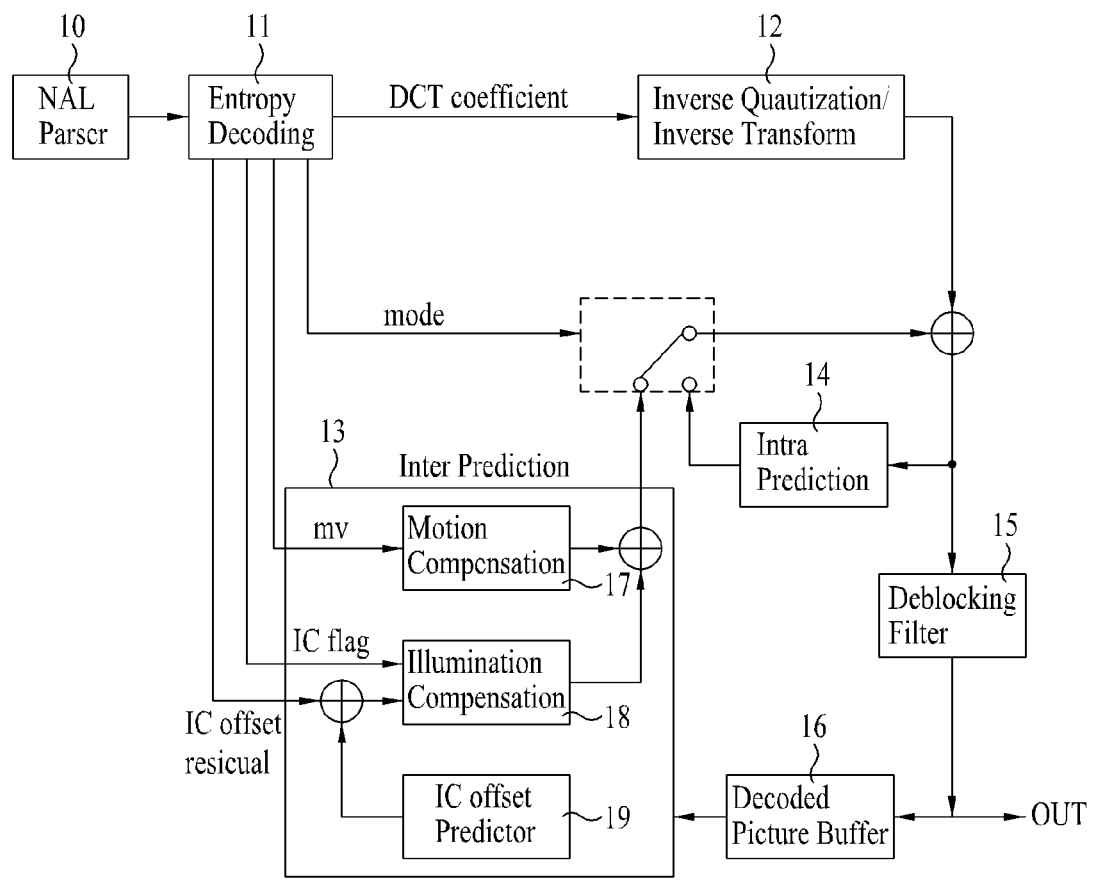
FIG. 1 is an exemplary decoding apparatus.

FIG. 1 is a block diagram illustrating an exemplary decoding apparatus (or "decoder") of a multiview video system for decoding a video signal containing a multiview video sequence. The multiview video system includes a corresponding encoding apparatus (or "encoder") to provide the multiview video sequence as a bitstream that includes encoded image data embodied on a machine-readable information carrier (e.g., a machine-readable storage medium, or a machine-readable energy signal propagating between a transmitter and receiver.)

Referring to FIG. 1, the decoding apparatus includes a parsing unit 10, an entropy decoding unit 11, an Inverse Quantization/Inverse Transform unit 12, an inter-prediction unit 13, an intra-prediction unit 14, a deblocking filter 15, and a decoded-picture buffer 16.

The inter-prediction unit 13 includes a motion compensation unit 17, an illumination compensation unit 18, and an illumination-compensation offset prediction unit 19.

The parsing unit 10 performs a parsing of the received video sequence in NAL units to decode the received video sequence. Typically, one or more sequence parameter sets and picture parameter sets are transmitted to a decoder before a slice header and slice data are decoded. In this case, the NAL header or an extended area of the NAL header may include a variety of configuration information, for example, temporal level information, view level information, anchor picture ID information, and view ID information, etc.

In this case, the term "time level information" is indicative of hierarchical-structure information for providing temporal scalability from a video signal, such that sequences of a variety of time zones can be provided to a user via the above-mentioned temporal level information.

The term "view level information" is indicative of hierarchical-structure information for providing view scalability from the video signal. The multiview video sequence can define the temporal level and view level, such that a variety of temporal sequences and view sequences can be provided to the user according to the defined temporal level and view level.

In this way, if the level information is defined as described above, the user may employ the temporal scalability and the view scalability. Therefore, the user can view a sequence corresponding to a desired time and view, or can view a sequence corresponding to another limitation. The above-mentioned level information may also be established in various ways according to reference conditions. For example, the level information may be changed according to a camera location, and may also be changed according to a camera arrangement type. In addition, the level information may also be arbitrarily established without a special reference.

The term "anchor picture" is indicative of an encoded picture in which all slices refer to only slices in a current view and not slices in other views. A random access between views can be based on anchor pictures for multiview-sequence decoding.

Anchor picture ID information can be used to perform the random access process to access data of a specific view without requiring a large amount of data to be decoded.

The term "view ID information" is indicative of specific information for discriminating between a picture of a current view and a picture of another view. In order to discriminate one picture from other pictures when the video sequence signal is encoded, a Picture Order Count (POC) and frame number information (frame_num) can be used.

If a current sequence is determined to be a multiview video sequence, inter-view prediction can be performed. An identifier is used to discriminate a picture of the current view from a picture of another view.

A view identifier can be defined to indicate a picture's view. The decoding apparatus can obtain information of a picture in a view different from a view of the current picture using the above-mentioned view identifier, such that it can decode the video signal using the information of the picture. The above-mentioned view identifier can be applied to the overall encoding/decoding process of the video signal. Also, the above-mentioned view identifier can also be applied to the multiview video coding process using the frame number information "frame_num" considering a view.

Typically, the multiview sequence has a large amount of data, and a hierarchical encoding function of each view (also called a "view scalability") can be used for processing the large amount of data. In order to perform the view scalability function, a prediction structure considering views of the multiview sequence may be defined.

The above-mentioned prediction structure may be defined by structuralizing the prediction order or direction of several view sequences. For example, if several view sequences to be encoded are given, a center location of the overall arrangement is set to a base view, such that view sequences to be encoded can be hierarchically selected. The end of the overall arrangement or other parts may be set to the base view.

If the number of camera views is denoted by an exponential power of "2", a hierarchical prediction structure between several view sequences may be formed on the basis of the above-mentioned case of the camera views denoted by the exponential power of "2". Otherwise, if the number of camera views is not denoted by the exponential power of "2", virtual views can be used, and the prediction structure may be formed on the basis of the virtual views. If the camera arrangement is indicative of a two-dimensional arrangement, the prediction order may be established by turns in a horizontal or vertical direction.

A parsed bitstream is entropy-decoded by an entropy decoding unit 11, and data such as a coefficient of each macroblock, a motion vector, etc., are extracted. The inverse quantization/inverse transform unit 12 multiplies a received quantization value by a predetermined constant to acquire a transformed coefficient value, and performs an inverse transform of the acquired coefficient value, such that it reconstructs a pixel value. The inter-prediction unit 13 performs an inter-prediction function from decoded samples of the current picture using the reconstructed pixel value.

At the same time, the deblocking filter 15 is applied to each decoded macroblock to reduce the degree of block distortion. The deblocking filter 15 performs a smoothing of the block edge, such that it improves an image quality of the decoded frame. The selection of a filtering process is dependent on a boundary strength and a gradient of image samples arranged in the vicinity of the boundary. The filtered pictures are stored in the decoded picture buffer 16, such that they can be outputted or be used as reference pictures.

The decoded picture buffer 16 stores or outputs pre-coded pictures to perform the inter-prediction function. In this case, frame number information "frame_num" and POC (Picture Order Count) information of the pictures are used to store or output the pre-coded pictures. Pictures of other view may exist in the above-Mentioned pre-coded pictures in the case of the MVC technology. Therefore, in order to use the above-mentioned pictures as reference pictures, not only the "frame_num" and POC information, but also view identifier indicating a picture view may be used as necessary.

The inter-prediction unit 13 performs the inter-prediction using the reference pictures stored in the decoded picture buffer 16. The inter-coded macroblock may be divided into macroblock partitions. Each macroblock partition can be predicted by one or two reference pictures.

The motion compensation unit 17, compensates for a motion of the current block using the information received from the entropy decoding unit 11. The motion compensation unit 17 extracts motion vectors of neighboring blocks of the current block from the video signal, and obtains a motion-vector predictor of the current block. The motion compensation unit 17 compensates for the motion of the current block using a difference value between the motion vector and a predictor extracted from the video signal and the obtained motion-vector predictor. The above-mentioned motion compensation may be performed by only one reference picture, or may also be performed by a plurality of reference pictures.

Therefore, if the above-mentioned reference pictures are determined to be pictures of other views different from the current view, the motion compensation may be performed according to a view identifier indicating the other views.

A direct mode is indicative of a coding mode for predicting motion information of the current block on the basis of the motion information of a block which is completely decoded. The above-mentioned direct mode can reduce the number of bits required for encoding the motion information, resulting in the increased compression efficiency.

For example, a temporal direct mode predicts motion information of the current block using a correlation of motion information of a temporal direction. Similar to the temporal direct mode, the decoder can predict the motion information of the current block using a correlation of motion information of a view direction.

If the received bitstream corresponds to a multiview sequence, view sequences may be captured by different cameras respectively, such that a difference in illumination may occur due to internal or external factors of the cameras. In order to reduce potential inefficiency associated with the difference in illumination, an illumination compensation unit 18 performs an illumination compensation function.

In the case of performing illumination compensation function, flag information may be used to indicate whether an illumination compensation at a specific level of a video signal is performed. For example, the illumination compensation unit 18 may perform the illumination compensation function using flag information indicating whether the illumination compensation of a corresponding slice or macroblock is performed. Also, the above-mentioned method for performing the illumination compensation using the above-mentioned flag information may be applied to a variety of macroblock types (e.g., an inter 16×16 mode, a B-skip mode, a direct mode, etc.)

In order to reconstruct the current block when performing the illumination compensation, information of a neighboring block or information of a block in views different from a view of the current block may be used, and an offset value of the current block may also be used.

In this case, the offset value of the current block is indicative of a difference value between an average pixel value of the current block and an average pixel value of a reference block corresponding to the current block. As an example for using the above-mentioned offset value, a predictor of the current-block offset value may be obtained by using the neighboring blocks of the current block, and a residual value between the offset value and the predictor may be used.

Therefore, the decoder can reconstruct the offset value of the current block using the residual value and the predictor.

In order to obtain the predictor of the current block, information of the neighboring blocks may be used as necessary.

For example, the offset value of the current block can be predicted by using the offset value of a neighboring block. Prior to predicting the current-block offset value, it is determined whether the reference index of the current block is equal to a reference index of the neighboring blocks. According to the determined result, the illumination compensation unit 18 can determine which one of neighboring blocks will be used or which value will be used.

The illumination compensation unit 18 may perform the illumination compensation using a prediction type of the current block. If the current block is predictively encoded by two reference blocks, the illumination compensation unit 18 may obtain an offset value corresponding to each reference block using the offset value of the current block.

As described above, the inter-predicted pictures or intra-predicted pictures acquired by the illumination compensation and motion compensation are selected according to a prediction mode, and reconstructs the current picture.

A variety of examples of encoding/decoding method for reconstructing a current picture are described later in this document.

FIG. 2 is a flow chart illustrating a method for encoding a video sequence.

Referring to FIG. 2, an example of a video-sequence encoding method obtains an average pixel value of at least one block from among neighboring blocks of a current block and reference blocks of another view at step S131. Upon receipt of the obtained value, the video-sequence encoding method derives a predicted average pixel value of the current block using at least one mode from among several modes at step S132. The video-sequence encoding method obtains a difference value between the predicted average pixel value and the actual average pixel value of the current block at step S133. The video-sequence encoding method measures individual encoding efficiency of the above-mentioned several modes, and selects an optimum mode from among the several modes at step S134. The above-mentioned optimum mode can be selected in various ways, for example, a method for selecting a minimum difference value from among the obtained difference values, and a method for using an equation indicating the relationship of Rate-Distortion (RD), etc.

In this case, the above-mentioned RD equation recognizes not only the number of encoding bits generated during the encoding of a corresponding block but also a distortion value indicating a difference value associated with an actual image, such that it calculates costs using the number of encoding bits and the distortion value. In more detail, the video-sequence encoding method multiplies the bit number by a Lagrange multiplier determined by a quantization coefficient, and adds the distortion value to the multiplied result, such that it calculates the costs. If the optimum mode is selected, the video-sequence encoding method can encode identification (ID) information indicating the selected mode, and transmit the encoded result. Alternatively, if the optimum mode is selected, the video-sequence encoding method can encode not only the ID information indicating the selected mode but also the difference value obtained by the selected mode, and transmit the encoded result at step S135.

Figure 3:
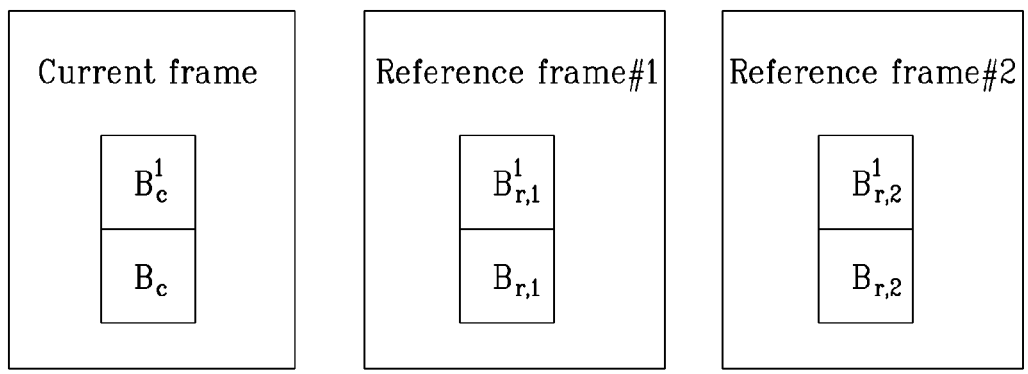
FIG. 3 is a block diagram illustrating a process for deriving a predicted average pixel value of a current block from reference blocks of other views.

FIG. 3 is a block diagram illustrating a process for deriving a predicted average pixel value of a current block from reference blocks of another view.

Referring to FIG. 3, it is assumed that an average pixel value of the $B_c$ block is $m_c$, an average pixel value of the $B_{r,1}$ block is $m_{r,1}$, and an average pixel value of the remaining blocks is represented by the above-mentioned block notation. There are a variety of methods for predicting $m_c$ information according to information of one or more neighboring blocks. For the convenience of description, it is assumed that the reference frame #1 is used as a candidate reference frame in the case of encoding the $B_c$ block.

A first method for predicting $m_c$ information according to information of one or more neighboring blocks is a first mode method (Mode1) for predicting the $m_c$ information on the basis of an average pixel value of a reference block of another view corresponding to the current block. In more detail, the first mode method (Mode1) is indicative of the method for predicting the $m_c$ information using the average pixel value the $B_{r,1}$ block of the reference frame #1. The difference value can be represented by the following equation 1;

$$e = m_c - m_{r,1} \quad \text{[Equation 1]}$$

A second method for predicting a difference value between an average pixel value of a current block and an average pixel value of a reference block of another view corresponding to the current block is a second mode method (Mode2) for predicting the difference value on the basis of a difference between average pixel values of each neighboring blocks of the current block and the reference block. In more detail, the second mode method (Mode2) predicts a difference value between an average pixel value of the current block and an average pixel value of the $B_{r,1}$ block of the reference frame #1 using a difference value in average pixel values between neighboring blocks ($B_c^1, B_{r,1}^1$). The difference value can be represented by the following equation 2:

$$e = (m_c - m_{r,1}) - (m_c^1 - m_{r,1}^1) \quad \text{[Equation 2]}$$

A third method for predicting a difference value between an average pixel value of a current block and an average pixel value of a reference block of another view corresponding to the current block is third mode method (Mode3) for predicting the difference value using a difference between an average pixel value of a neighboring block of the current block and an average pixel value of the reference block. In more detail, the third mode method (Mode3) predicts the $m_c$ information on the basis of a difference between an average pixel value of the neighboring block $B_c^1$ and an average pixel value of the $B_{r,1}$ block of the reference frame #1. In this case, the difference value can be represented by the following equation 3:

$$e = (m_c - m_{r,1}) - (m_c^1 - m_{r,1}^1) = m_c - m_c^1 \quad \text{[Equation 3]}$$

In the case of encoding a neighboring block of the current block by using the neighboring blocks of the reference block of another view, there is a fourth mode method (Mode4) for predicting the $m_c$ information on the basis of predicted average pixel values of the neighboring blocks of the current block. In other words, if the $B_c^1$ block is pre-encoded by referring to the $B_{r,2}^1$ block of the reference frame #2, a difference value between the average pixel value of the current block ($B_c$) and a reference block ($B_{r,1}$) corresponding to the current block can be predicted by a difference value between the average pixel value of the neighboring block of the current block ($B_c^1$) and an average pixel value of neighboring block of another view reference block ($B_{r,2}^1$).

In this case, the difference value can be represented by the following equation 4:

$$e = (m_c - m_{r,1}) - (m_c^1 - m_{r,2}^1) \quad \text{[Equation 4]}$$

In the case of using the neighboring-block information using the above-mentioned Mode2, Mode3, and Mode4 methods, although the above-mentioned Mode2, Mode3, and Mode4 methods have disclosed that only one information of the next upper-block is exemplarily used, it should be noted that the combination of information of several neighboring blocks surrounding the current block may also be used as an example.

Figure 4:
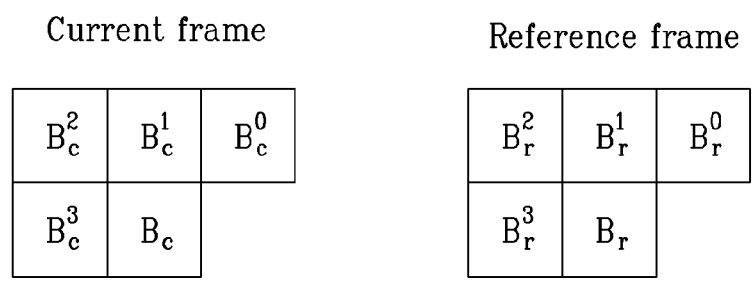
FIG. 4 is a detailed block diagram illustrating a process for deriving a predicted average pixel value of a current block from reference blocks of other views.

FIG. 4 is a detailed block diagram illustrating a process for deriving a predicted average pixel value of a current block from reference blocks of other views.

In more detail, FIG. 4 shows a current block, pre-encoded blocks, each of which shares a boundary with the current block, and other blocks, each of which shares a boundary with the reference block. In this case, the Mode2-method equation, the Mode3-method equation, and the Mode4-method equation can be represented by the following equation 5:

$$\text{Mode 2}: e = (m_c - m_{r,1}) - \frac{\sum_i w_i (m_c^i - m_{r,1}^i)}{\sum_i w_i} \quad \text{[Equation 5]}$$

$$\text{Mode 3}: e = (m_c - m_{r,1}) - \frac{\sum_i w_i (m_c^i - m_{r,1}^i)}{\sum_i w_i} = m_c - \frac{\sum_i w_i m_c^i}{\sum_i w_i}$$

$$\text{Mode 4}: e = (m_c - m_{r,1}) - \frac{\sum_i w_i (m_c^i - m_{r,k}^i)}{\sum_i w_i}$$

In the above-mentioned Mode4 equation, $m_{r,k}^i$ indicates an average pixel value of a reference block of the $B_c^i$ block on the condition that the reference block is located at the reference frame #k.

In Equation 5, $w_i$ indicates a weighted coefficient. The neighboring blocks used for prediction are not limited to blocks sharing a boundary, and may also include other blocks adjacent to the above-mentioned neighboring blocks as necessary. Otherwise, the above-mentioned neighboring blocks may also employ only some parts of the other blocks. The scope of the above-mentioned neighboring blocks may be adjusted by the $w_i$. In this way, the difference value (e) is quantized and entropy-encoded, such that the entropy-encoded information is transmitted to the decoding unit.

The reference frames of the above-mentioned Mode1, Mode2, Mode3, and Mode4 methods are determined to be optimum frames in consideration of rate and distortion factors after calculating several steps to an actual bitstream stage. There are a variety of methods for selecting the optimum mode, for example, a method for selecting a specific mode of a minimum difference value from among the obtained difference values, and a method for using the RD relationship.

The above-mentioned RD-relationship method calculates actual bitstreams of individual modes, and selects an optimum mode in consideration of the rate and the distortion. In the case of calculating a block residual value, the above-mentioned RD-relationship method deducts an average pixel value of each block from the current block, deducts the average pixel value of each block from the reference block, and calculates a difference value between the deducted results of the current and reference blocks, as represented by the following equation 6:

$$\sum_i \sum_j |I_c(i,j) - \tilde{m}_c - (I_r(i+\Delta x, j+\Delta y) - m_r)| \quad \text{[Equation 6]}$$

In Equation 6, (Δx,Δy) is indicative of a disparity vector, and I is a pixel value. If a value predicted by information of a neighboring block and a difference value are quantized, and the quantized resultant values of the predicted value and the difference value are reconstructed, and the reconstructed resultant values are added, the added result is denoted by $\tilde{m}_c$ of Equation 6. In this case, the value of $\tilde{m}_c$ is adapted to obtain the same values from the encoding unit and the decoding unit. $m_r$ is indicative of an average pixel value of a reference block. In the case of the decoded image, the encoding unit has the same $m_r$ as that of the decoding unit. Indeed, the reference block is searched for in a time domain, and an optimum block is searched for in a space-time domain. Therefore, ID information indicating whether an illumination compensation will be used is set to "0" or "1" in association with individual frames and blocks, and the resultant ID information is entropy-encoded.

If the optimum mode is selected, it is possible to encode only the selected mode, such that the encoded result of the selected mode may be transmitted to the decoding unit. In addition to the encoded result of the selected mode, a difference value obtained by the selected mode can also be encoded and transmitted. The selected mode information is represented by index types, and can also be predicted by neighboring-mode information. In addition, a difference value between the index of the currently-selected mode and the index of the predicted mode can also be encoded and transmitted.

All of the above-mentioned modes may be considered, some of the above-mentioned modes may be selected, or only one of the above-mentioned modes may also be selected as necessary. In the case of using a single method from among all available methods, there is no need to separately encode the mode index.

In the case of obtaining an average pixel value and deriving a predicted average pixel value, pre-decoded pixel values may be applied to current blocks of a reference frame and a target frame to be encoded.

Basically, pre-decoded values of left-side pixels and pre-decoded values of upper-side pixels are used to predict an average pixel value of the current block. In the case of encoding an actual video sequence, the video sequence is encoded on the basis of a macroblock. The 16×16 macroblock is divided into 16×8 blocks, 8×16 blocks, and 8×8 blocks, and is then decoded. The 8×8 blocks may also be divided into 8×4 blocks, 4×8 blocks, and 4×4 blocks. There are a variety of methods for predicting an average pixel value of sub-blocks on the basis of a single macroblock.

FIG. 5 is a conceptual diagram illustrating a 16×16 macroblock for explaining usages of pre-decoded pixel values located at left- and upper-parts of an entire block in the case of deriving an average pixel value and a predicted average pixel value of a current block.

Referring to FIG. 5, the 16×16 macroblock can use all the pixel values of the left- and upper-parts. Therefore, in the case of predicting an average pixel value of the current block, an average pixel value of pixels (h1~h16) of the upper part and pixels (v1~v16) of the left part is calculated, and an average pixel value of the current block is predicted by the calculated average pixel value of the pixels (v1~v16, h1~h16). In this case, the average pixel value of the 16×16 block (denoted by "B16×16") can be represented by the following equation 7:

$$\frac{\sum_{i=1}^{16} hi + \sum_{i=1}^{16} vi}{32} \quad \text{[Equation 7]}$$

Figure 6B:
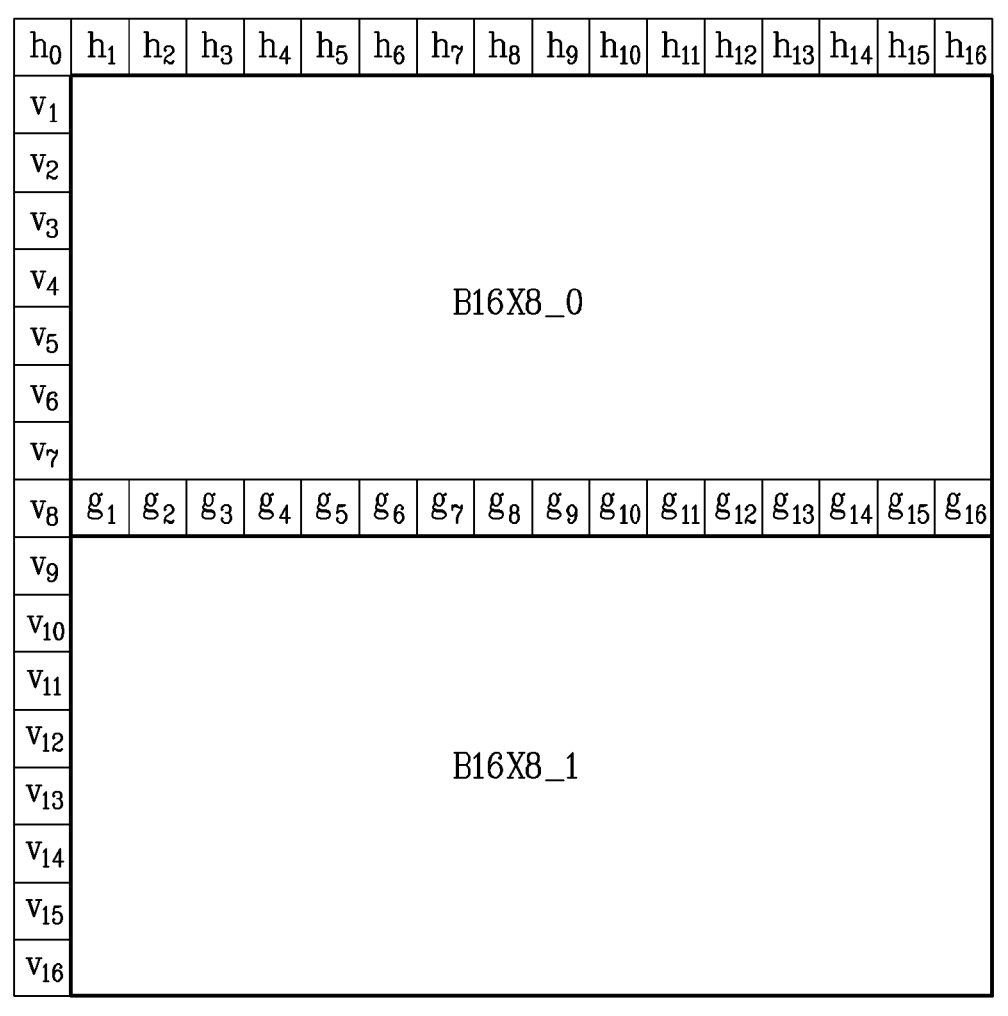

FIG. 6A is a conceptual diagram illustrating a 16×8 macroblock for explaining usages all the pixels enclosing divided blocks in the case of deriving an average pixel value and a predicted average pixel value of the divided blocks. FIG. 6B is a conceptual diagram illustrating a 16×8 macroblock for explaining usages of only pixels enclosing divided blocks in the case of deriving an average pixel value and a predicted average pixel value of the divided blocks.

In FIG. 6A, in the case of using all the pixels enclosing the divided blocks, an average value of the B16×8_0 block and the B16×8_1 block cab be represented by the following equation 8:

$$\frac{\sum_{i=1}^{16} hi + \sum_{i=1}^{16} vi}{32} \quad \text{[Equation 8]}$$

In FIG. 6B, in the case of using all the pixels enclosing the divided blocks, an average value of the B16×8_0 block can be represented by the following equation 9, and an average value of the B16×8_1 block can be represented by the following equation 10:

$$\frac{\sum_{i=1}^{16} hi + \sum_{i=1}^{8} vi}{24} \quad \text{[Equation 9]}$$

$$\frac{\sum_{i=1}^{16} gi + \sum_{i=9}^{16} vi}{24} \quad \text{[Equation 10]}$$

In the above-mentioned cases of FIGS. 6A-6B, the value of $h_0$ located at the corner of the macroblock may also be added to the calculation result as necessary. In this case, an average pixel value of the B16×8_0 block of FIG. 6A can be represented by the following equation 11, and the average pixel value of the B16×8_0 of FIG. 6B can be represented by the following equation 12:

$$\frac{\sum_{i=0}^{16} hi + \sum_{i=1}^{16} vi}{33} \quad \text{[Equation 11]}$$

$$\frac{\sum_{i=0}^{16} hi + \sum_{i=1}^{8} vi}{25} \quad \text{[Equation 12]}$$

In the above-mentioned cases of FIGS. 6A-6B, the values of $h_0$ and $v_8$ located at the corners of the macroblock may also be added to the calculation result as necessary. In this case, an average pixel value of the B16×8_1 block of FIG. 6A can be represented by the following equation 13, and the average pixel value of the B16×8_1 of FIG. 6B can be represented by the following equation 14:

$$\frac{\sum_{i=0}^{16} hi + \sum_{i=1}^{16} vi}{33}$$ [Equation 13]

$$\frac{\sum_{i=0}^{16} gi + \sum_{i=8}^{16} vi}{25}$$ [Equation 14]

FIG. 7A is a conceptual diagram illustrating a 8×16 macroblock for explaining usages of all the pixels enclosing divided blocks in the case of deriving an average pixel value and a predicted average pixel value of the divided blocks. FIG. 7B is a conceptual diagram illustrating a 8×16 macroblock for explaining usages of only pixels enclosing divided blocks in the case of deriving an average pixel value and a predicted average pixel value of the divided blocks. The method for deriving an average pixel value of the divided blocks is the same as that of FIGS. 6A-6B.

Figure 8A:
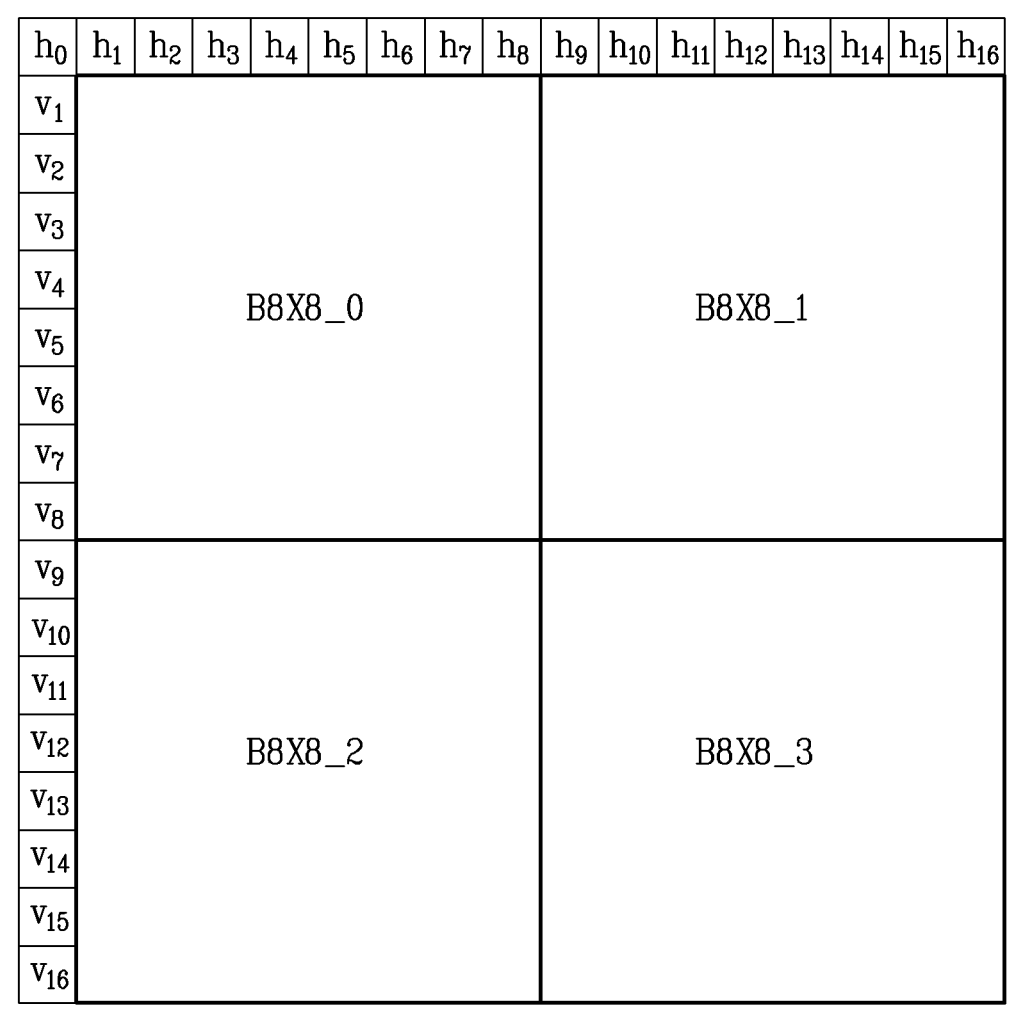

FIG. 8A is a conceptual diagram illustrating a 8×8 macroblock for explaining usages of all the pixels enclosing divided blocks in the case of deriving an average pixel value and a predicted average pixel value of the divided blocks. FIG. 8B is a conceptual diagram illustrating a 8×8 macroblock for explaining usages of only pixels enclosing divided blocks in the case of deriving an average pixel value and a predicted average pixel value of the divided blocks. The method for deriving an average pixel value of the divided blocks is the same as that of FIGS. 6A-6B.

The 8×8 block can be divided into a plurality of sub-blocks.

An average pixel value of a corresponding block of a current block of a current frame to be encoded is predicted, such that the predicted average pixel value is set to $\hat{m}_c$. An average pixel value of a corresponding block of the reference frame is predicted, such that the predicted average pixel value is set to $\hat{m}_r$.

Each predicted average pixel value is deducted from all pixels of each block, and a difference value between the predicted pixel value using the reference block and a pixel value of the current block can be calculated by the following equation 15:

$$\sum_{i} \sum_{j} |I_c(i, j) - \hat{m}_c - (I_r(i + \Delta x, j + \Delta y) - \hat{m}_r)|$$ [Equation 15]

In Equation 15, (Δx,Δy) is indicative of a disparity vector, and I is a pixel value. A reference block having a minimum block residual value is selected as an illumination-compensated optimum block. In this case, the disparity vector is denoted by (Δx,Δy). Indeed, a system compares the above-mentioned illumination-compensated case with another case in which the illumination is not compensated, and selects a superior one of the two cases.

As a modified example of the above-mentioned scheme, an average pixel value of the reference block is not predicted by pixel values of neighboring blocks, and is directly calculated by an average pixel value of all pixels contained in an actual block.

As another modified example of the above-mentioned scheme, the number of left- and upper-part pixels may be increased. In more detail, pixels of two or more neighboring layers of a current layer may be used instead of pixels of only one layer next to a current layer.

The decoding unit determines whether to perform an illumination compensation of a corresponding block using the ID information. If the illumination compensation is performed, the decoding unit calculates a decoded value of the difference value (e), and obtains a predicted value according to an above-mentioned prediction method. The decoded value of the difference value (e) is added to the predicted value, such that the value of $\hat{m}_c$ ($=\hat{m}_c+e$) can be decoded. The value of $\hat{m}_r-\hat{m}_c$ is deducted from the reference block, which is prediction block so called predictor for the current block, and the deducted result is added to the decoded value of the residual block, such that the value of the current block can be finally obtained. The current block can be reconstructed as follow:

B=prediction block+residual block+($\hat{m}_c-\hat{m}_r+e$), where B is the value of the current block, reference block is the predictor for the current block, $\hat{m}_c-\hat{m}_r$ is a predicted difference of average pixel values, that is the predicted offset value of illumination compensation for the current block, and e is the difference value. The decoding unit obtains the difference between a offset value of illumination compensation of the current block and a predicted difference, and can reconstruct the offset value of illumination compensation of the current block using the obtained residual block value and the predicted difference.

Figure 9:
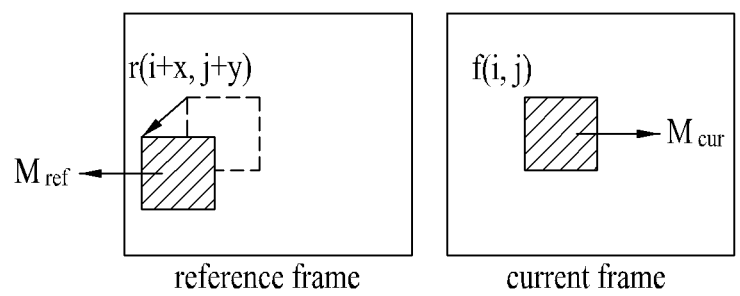
FIG. 9 is a diagram illustrating a process for obtaining an offset value of a current block.

FIG. 9 is a diagram illustrating a process for obtaining an offset value of a current block.

The illumination compensation may be performed during the motion estimation. When it compares the current block with the reference block, a difference in illumination between two blocks is considered. New motion estimation and new motion compensation are used to compensate for the illumination difference. A new SAD (Sum of Absolute Differences) can be represented by the following equations 16 and 17:

$$SAD = \sum_{x=m}^{M+m-1} \sum_{y=n}^{N+n-1} \left| \begin{array}{c} (I_c(x, y) - M_c) - \\ (I_r(x + \Delta x, y + \Delta y) - M_r) \end{array} \right|$$ [Equation 16]

$$= \sum_{x=m}^{M+m-1} \sum_{y=n}^{N+n-1} \left| \left( \begin{array}{c} I_c(x, y) - \\ I_r(x + \Delta x, y + \Delta y)) - (M_c - M_r) \end{array} \right) \right|$$

$$M_c = \sum_{x=m}^{M+m-1} \sum_{y=n}^{N+n-1} I_c(x, y)$$ [Equation 17]

$$M_r = \sum_{x=m}^{M+m-1} \sum_{y=n}^{N+n-1} I_r(x + \Delta x, y + \Delta y)$$

With reference to Equations 16 and 17, $M_c$ is indicative of an average pixel value of the current block, and $M_r$ is indicative of an average pixel value of the reference block. $I_c(x,y)$ is indicative of a pixel value at a specific coordinate (x,y) of the current block, and $I_r(x+\Delta x, y+\Delta y)$ is indicative of a pixel value at a motion vector (Δx,Δy) of the reference block. The motion estimation is performed on the basis of the new SAD denoted by Equation 16, such that a difference value between an average pixel value of the current block and an average pixel value of the reference block can be obtained. The difference value in average pixel value between the current block and the reference block is referred to as an offset value (IC_offset).

If the motion estimation applying for the illumination compensation is performed, the offset value and the motion vector are obtained. The illumination compensation can be performed by the following equation 18 using the offset value and the motion vector:

$R(x,y)=I_c(x,y)-I_r(x+\Delta x,y+\Delta y)-(M_c-M_r)$ [Equation 18]

With reference to Equation 18, R(x,y) is indicative of an illumination-compensated residual value.

The offset value (IC_offset=$M_c-M_r$) is transmitted to the decoding unit. The illumination compensation of the decoding unit can be performed by the following equation 19:

$$I'_c(x,y)=I_r(x+\Delta x,y+\Delta y)+R'(x,y)+(M_c-M_r)$$ [Equation 19]

With reference to Equation 19, R'(x,y) is indicative of an reconstructed and illumination-compensated residual value, and I'$_c$(x,y) is indicative of a pixel value of the current block.

In order to reconstruct the current block, the offset value is transmitted to the decoding unit, and the offset value can be predicted by data of the neighboring blocks. In order to further reduce the number of bits for coding the offset value, a difference value ($R_{IC\_offset}$) between the current-block offset value (IC_offset) and the neighboring-block offset value (IC_offset_pred) can be transmitted to the decoding unit 50, as denoted by the following equation 20:

$$R_{IC\_offset}=IC\_offset-IC\_offset\_pred$$ [Equation 20]

Figure 10:
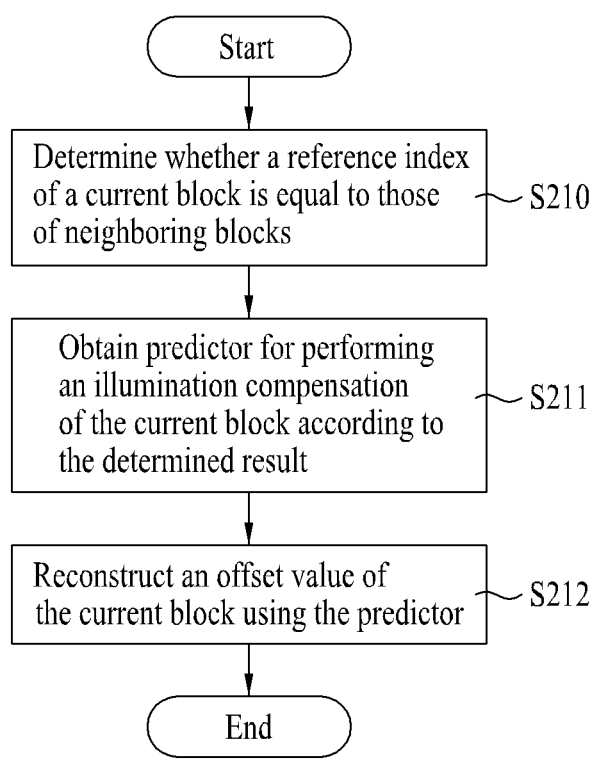
FIG. 10 is a flowchart illustrating a process for performing illumination compensation of a current block.

FIG. 10 is a flow chart illustrating a process for performing for an illumination compensation of a current block.

Referring to FIG. 10, if an illumination compensation flag of a current block is set to "0", the illumination compensation of the current block is not performed. Otherwise, if the illumination compensation flag of the current block is set to "1", a process for reconstructing the offset value of the current block is performed. In the case of obtaining a predictor of the current block, information of the neighboring block can be employed. It is determined whether a reference index of the current block is equal to a reference index of the neighboring block at step S210. A predictor for performing the illumination compensation of the current block is obtained on the basis of the determined result at step S211. An offset value of the current block is reconstructed by using the obtained predictor at step S212. In this case, the step S210 for determining whether the reference index of the current block is equal to that of the neighboring block and the step S211 for obtaining the predictor on the basis of the determined result will hereinafter be described with reference to FIG. 11.

Figure 11:
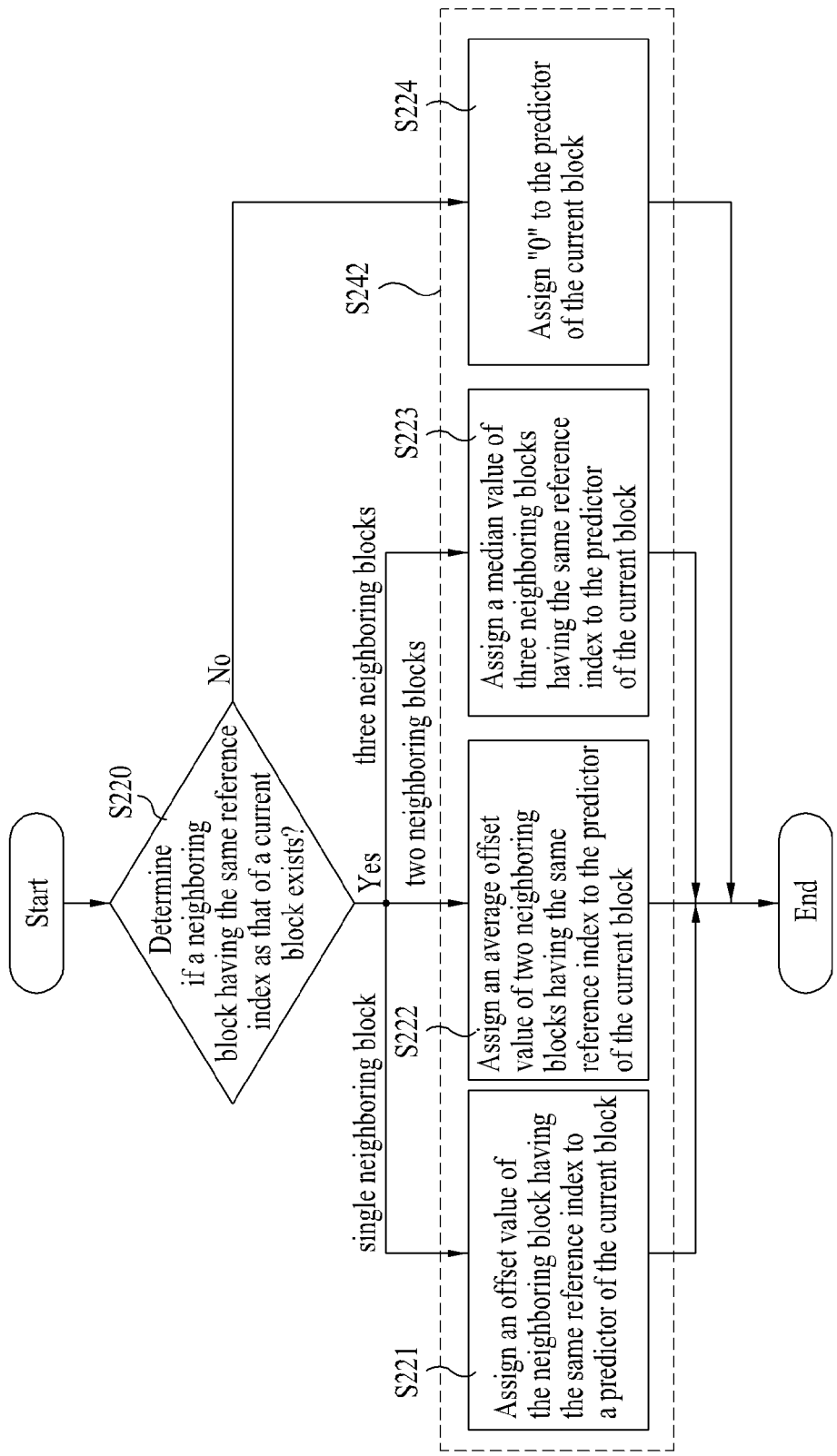
FIG. 11 is a flowchart illustrating a method for obtaining a predictor by determining whether a reference index of a current block is equal to a reference index of a neighboring block.

FIG. 11 is a flow chart illustrating a method for obtaining a predictor by determining whether a reference index of a current block is equal to a reference index of a neighboring block.

Referring to FIG. 11, in order to perform an illumination compensation, the decoding unit extracts a variety of information from a video signal, for example, flag information and offset values of neighboring blocks of the current block, and reference indexes of reference blocks of the current and neighboring blocks, such that the decoding unit can obtain the predictor of the current block using the extracted information. The decoding unit obtains a residual value between the offset value of the current block and the predictor, and can reconstruct the offset value of the current block using the obtained residual value and the predictor.

In the case of obtaining the predictor of the current block, information of the neighboring block can be employed. For example, the offset value of the current block can be predicted by the offset value of the neighboring block. Prior to predicting the offset value of the current block, it can be determined whether the reference index of the current block is equal to that of the neighboring block, such that it can be determined which one of values or which one of neighboring blocks will be used by referring to the determined result. Also, it is determined whether flag information of the neighboring block is set to "true", such that it can be determined whether the neighboring block will be used by referring to the determined result.

According to a first example, it is determined whether the neighboring block having the same reference index as that of the current block exists at step S220. If it is determined that only one neighboring block having the same reference index as that of the current block exists, an offset value of the neighboring block having the same reference index is assigned to the predictor of the current block at step S221. If it is determined that two neighboring blocks, each of which has the same reference index as that of the current block, exit at step S220, an average value of the offset values of the two neighboring blocks is assigned to the predictor of the current block at step S222. If it is determined that three neighboring blocks, each of which has the same reference index as that of the current block, exist at step S220, a median value of the offset values of the three neighboring blocks is assigned to the predictor of the current block at step S223. If it is determined that there is no neighboring block having the same reference index as that of the current block according to the determined result at step S220, the predictor of the current block is set to "0" at step S224. If required, the step S220 for determining whether the reference index of the current block is equal to that of the neighboring block may further include another step for determining whether a flag of the neighboring block is set to "1".

According to a second example, it is determined whether the neighboring block has the same reference index as that of the current block, and it is determined whether a flag of the neighboring block is set to "1". If it is determined that the neighboring block has the same reference index as that of the current block, and has the flag of "1", an offset value of the neighboring block may be set to the predictor of the current block. In this case, a plurality of neighboring blocks may be checked in the order of a left neighboring block→upper neighboring block→a right-upper neighboring block→a left-upper neighboring block. If required, the neighboring blocks may also be checked in the order of the upper neighboring block→the left neighboring block→the right-upper neighboring block→the left-upper neighboring block. If there is no neighboring block capable of satisfying the two conditions, and flags of the three neighboring blocks (i.e., the left neighboring block, the upper neighboring block, and the right-upper (or left-upper) neighboring block) are set to "1", respectively, the median value of the offset values of the three blocks is set to the predictor. Otherwise, the predictor of the current block may be set to "0".

Figure 12:
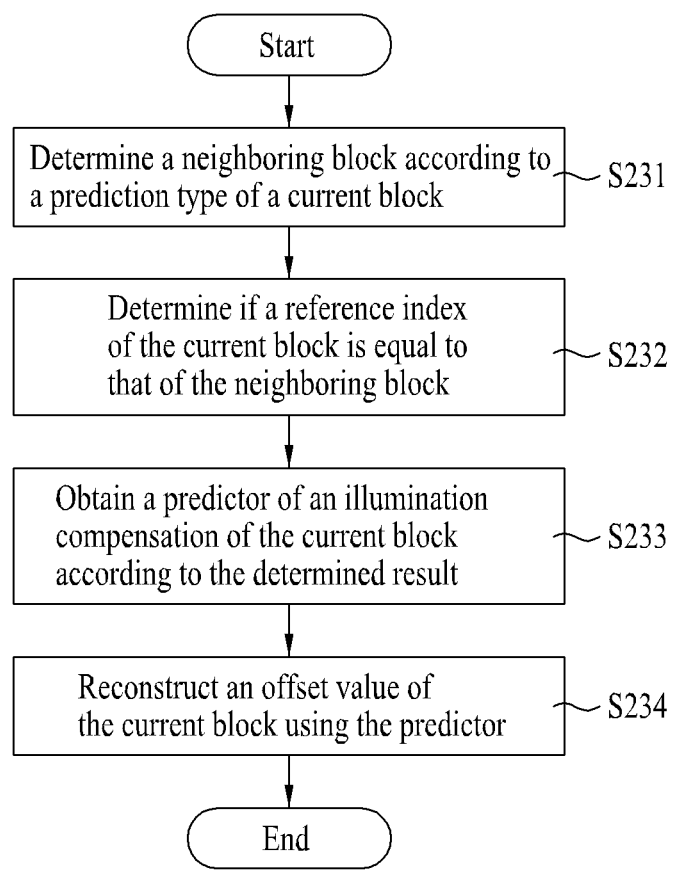
FIG. 12 is a flow chart illustrating a method for performing for an illumination compensation on the basis of a prediction type of a current block.

FIG. 12 is a flow chart illustrating a method for performing for an illumination compensation on the basis of a prediction type of a current block.

Referring to FIG. 12, the neighboring block acting as a reference block may be changed according to a prediction type of the current block. For example, if the current block has the same shape as that of the neighboring block, the current block is predicted by a median value of the neighboring blocks. Otherwise, if the shape of the current block is different from that of the neighboring block, another method will be employed.

For example, if a block located at the left side of the current block is divided into several sub-blocks, the uppermost sub-block from among the sub-blocks is used for the prediction. Also, if a block located at an upper part of the current block is divided into several sub-blocks, the leftmost sub-block is used for the prediction. In this case, a prediction value may be changed according to the prediction type of the current block. Therefore, the example of FIG. 12 determines a neighboring block to be referred by the prediction type of the current block at step S231. It is determined whether the reference index of the determined neighboring block is equal to a reference index of the current block at step S232. The step S232 for determining whether the reference index of the neighboring block is equal to that of the current block may further include another step for determining whether a flag of the neighboring block is set to "1". The predictor for performing an illumination compensation of the current block can be obtained on the basis of the determined result at step S233. The offset value of the current block is reconstructed by the obtained predictor, such that the illumination compensation can be performed at step S234. In this case, the process for performing the step S233 by referring to the result of step S232 will hereinafter be described in detail, and a detailed description thereof will be similar to that of FIG. 11.

For example, if the prediction type of the current block indicates that the prediction is performed by using a neighboring block located at the left side of the current block, it is determined whether the reference index of the left-side neighboring block is equal to that of the current block. If the reference index of the current block is equal to that of the left-side neighboring block, an offset value of the left-side neighboring block is assigned to the predictor of the current block. Also, if the prediction type of the current block indicates that the prediction is performed by referring to the left- and upper-neighboring blocks of the current block, or if the prediction is performed by referring to three neighboring blocks (i.e., the left neighboring block, the upper neighboring block, and the right-upper neighboring block), the individual cases will be applied similarly as a method of FIG. 11.

Figure 13:
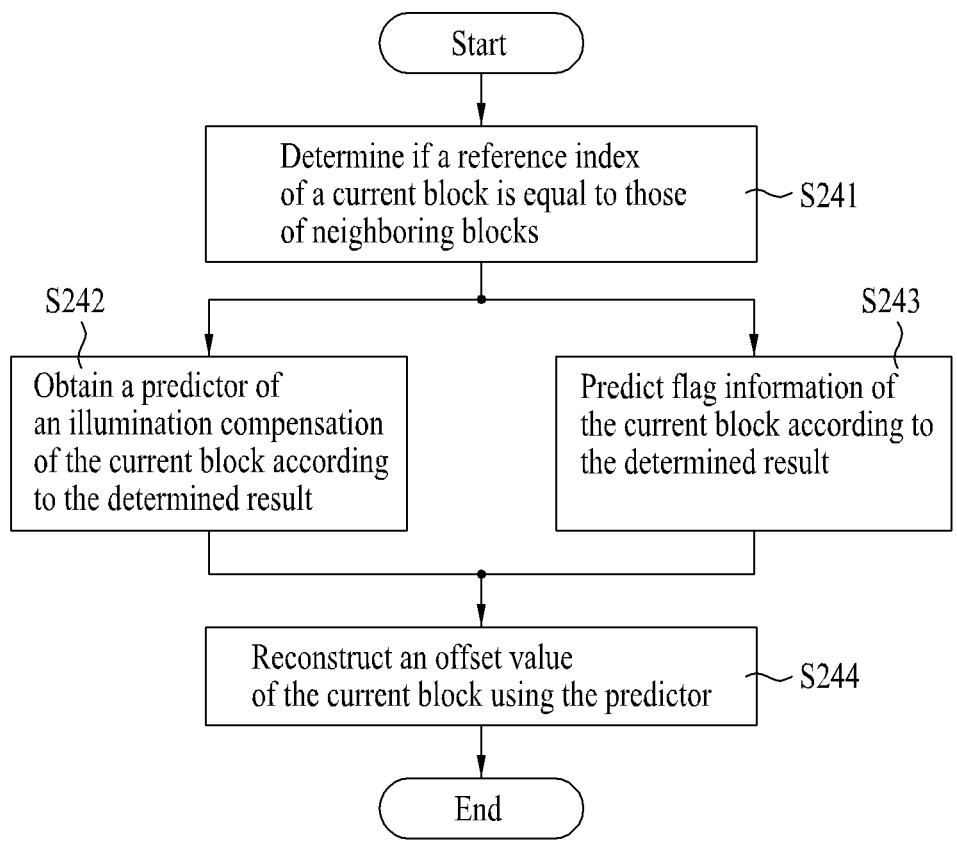
FIG. 13 is a flow chart illustrating a method for performing illumination compensation using flag information indicating whether the illumination compensation of a block is performed.

FIG. 13 is a flow chart illustrating a method for performing for an illumination compensation using flag information indicating whether the illumination compensation of a block is performed.

Referring to FIG. 13, flag information (IC_flag) indicating whether an illumination compensation of the current block is performed may also be used to reconstruct the offset value of the current block. In addition, the predictor may also be obtained using both the method for checking the reference index of FIG. 11 and the method for predicting flag information. Firstly, it is determined whether a neighboring block having the same reference index as that of the current block exists at step S241. A predictor for performing an illumination compensation of the current block is obtained by the determined result at step S242. In this case, a process for determining whether the flag of the neighboring block is "1" may also be included in the step S242. The flag information of the current block is predicted on the basis of the determined result at step S243. An offset value of the current block is reconstructed by using the obtained predictor and the predicted flag information, such that the illumination compensation can be performed at step S244. In this case, the step S242 may be applied similarly as a method of FIG. 11, and the step S243 will hereinafter be described with reference to FIG. 14.

Figure 14:
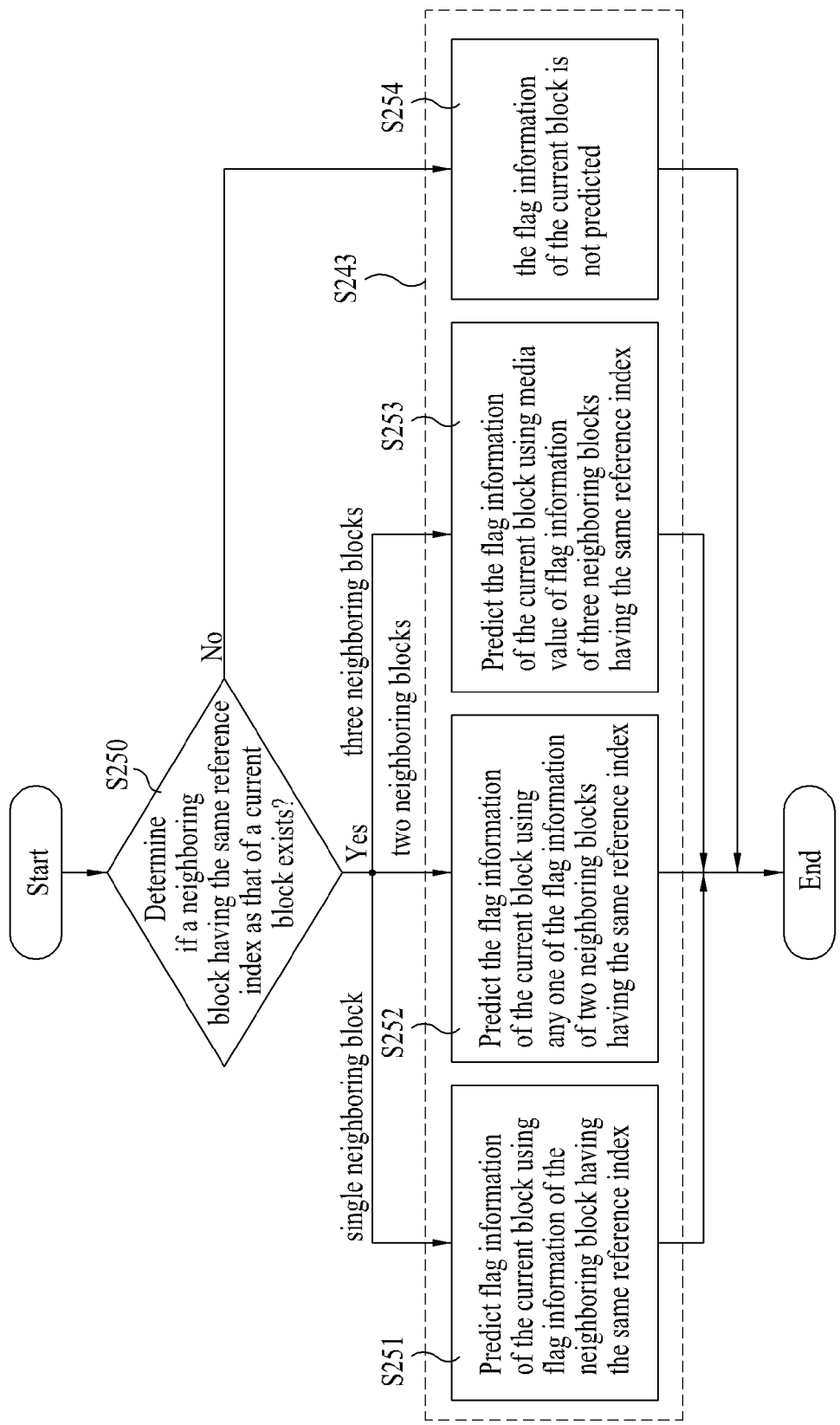
FIG. 14 is a flow chart illustrating a method for predicting flag information of a current block by determining whether a reference index of the current block is equal to a reference index of a neighboring block.

FIG. 14 is a flow chart illustrating a method for predicting flag information of a current block by determining whether a reference index of the current block is equal to a reference index of a neighboring block.

Referring to FIG. 14, it is determined whether the neighboring block having the same reference index as that of the current block exists at step S250. If it is determined that only one neighboring block having the same reference index as that of the current block exists, flag information of the current block is predicted by flag information of the neighboring block having the same reference index at step S251. If it is determined that two neighboring blocks, each of which has the same reference index as that of the current block, exist at step S250, flag information of the current block is predicted by any one of flag information of the two neighboring blocks having the same reference index at step S252.

If it is determined that three neighboring blocks, each of which has the same reference index as that of the current block, exist at step S250, the flag information of the current block is predicted by a median value of the flag information of the three neighboring blocks at step S253. Also, if there is no neighboring block having the same reference index as that of the current block according to the determined result of step S250, the flag information of the current block is not predicted at step S254.

Figure 15:
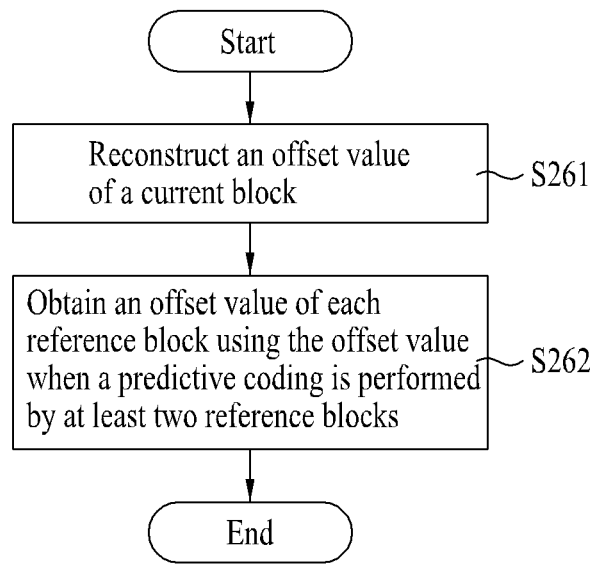
FIG. 15 is a flow chart illustrating a method for performing illumination compensation when a current block is predictively coded by two or more reference blocks.

FIG. 15 is a flow chart illustrating a method for performing an illumination compensation when a current block is predictively coded by two or more reference blocks.

Referring to FIG. 15, during performing the illumination compensation, if the current block is predictively coded by using two reference blocks, the decoding unit cannot directly recognize an offset value corresponding to each reference block, because it uses an average pixel value of the two reference blocks when obtaining the offset value of the current block. Therefore, in one example, an offset value corresponding to each reference block is obtained, resulting in the implementation of correct prediction. The offset value of the current block is reconstructed by using the predictor of the current block and the residual value at step S261. If the current block is predictively encoded by using two reference blocks, an offset value corresponding to each reference is obtained by the offset value at step S262, as denoted by the following equation 21:

$$IC\_offset = m_c - w_1 \times m_{r,1} - w_2 \times m_{r,2}$$

$$IC\_offsetL0 = m_c - m_{r,1} = IC\_offset + (w_1-1) \times m_{r,1} + w_2 \times m_{r,2}$$

$$IC\_offsetL1 = m_c - m_{r,2} = IC\_offset + w_1 \times m_{r,1} + (w_2-1) \times m_{r,2} \quad \text{[Equation 21]}$$

In Equation 21, $m_c$ is an average pixel value of the current block. $m_{r,1}$ and $m_{r,2}$ are indicative of an average pixel values of reference blocks, respectively. $w_1$ and $w_2$ are indicative of a weighted coefficients for a bi-predictive coding process, respectively.

In one example of the illumination compensation method, the system independently obtains an accurate offset value corresponding to each reference block, such that it can more correctly perform the predictive coding process. In the case of reconstructing the offset value of the current block at step S262, the system adds the reconstructed residual value and the predictor value, such that it obtains an offset value. In this case, the predictor of a reference picture of List0 and the predictor of a reference picture of List1 are obtained respectively and combined, such that the system can obtain a predictor used for reconstructing the offset value of the current block.

According to another example, the system can also be applied to skip-macroblock. In this case, the prediction is performed to obtain an information for the illumination-compensation. A value predicted by the neighboring block block is used as flag information indicating whether the illumination compensation is performed. An offset value predicted by the neighboring block may be used as the offset value of the current block. For example, if flag information is set to "true", the offset value is added to a reference block. In the case of a macroblock to which a P-skip mode is applied, the prediction is performed by using flags and offset values of the left- and upper-neighboring blocks, such that flag and offset values of the macroblock can be obtained. If only one block has the flag of "1", a flag and an offset value of the current block may be set to the flag and the offset value of the block, respectively. If two blocks have the flag of "1", the flag of the current block is set to "1", and the offset value of the current block is set to an average offset value of the two neighboring blocks.

According to another example, the system can also be applied to a direct mode, for example, temporal direct mode, B-skip mode, etc. In this case, the prediction is performed to obtain information of the illumination-compensation. Each predictor can be obtained by using the variable method for predicting the flag and the offset. This predictor may be set to an actual flag and an actual offset value of the current block. If each block has a pair of flags and offset information, a prediction value for each block can be obtained. In this case, if there are two reference blocks and the reference indexes of the two reference blocks are checked, it is determined whether the reference index of the current block is equal to that of the neighboring block. Also, if each reference block includes a unique offset value, first predicted flag information, a first predicted offset value, second predicted flag information, and a second predicted offset value can be obtained. In this case, a value predicted by the neighboring block may be used as the flag information. The offset values of the two reference blocks may be used as the first predicted offset value and the second predicted offset value, respectively. In this case, the offset value of the current block may be set to an average offset value of individual reference blocks.

In the direct mode or the skip macroblock mode, the system may encode/decode the flag information indicating whether the direct mode or the skip-macroblock mode is applied to the current block. In more detail, an offset value is added or not according to the flag value. A residual value between the offset value and the predicted offset value may also be encoded/decoded. In this case, desired data can be more correctly reconstructed, and an optimum mode may be selected in consideration of a RD (Rate-Distortion)-relationship. If a reference picture cannot be used for the prediction process, i.e., if a reference picture number is less than "1", the flag information or predicted flag information may be set to "false", and the offset value or the predicted offset value may also be set to "0".

According to another example, the system can also be applied to the entropy-coding process. In association with the flag information, three context models may be used according to flag values of the neighboring blocks (e.g., blocks located at the left- and upper-parts of the current block).

If it is determined that the flag value is set to "true", the value of "1" occurs. If it is determined that the flag value is set to "false", the value of "0" occurs. If the two values "1" and "0" of the two cases are added, three cases can be obtained. The flag information is encoded/decoded by using the three context models. A transform-coefficient level coding method can be used for the predictive residual value of the offset values. In other words, data binarization is performed by UEG0, a single context model can be applied to a first bin value, and another context mode is applied to the remaining bin values of a unary prefix part A sign bit is encoded/decoded by a bypass mode. According to another example of the flag information, two contexts may be considered according to a predicted flag values, such that the encoding/decoding process can be performed.

Figure 16:
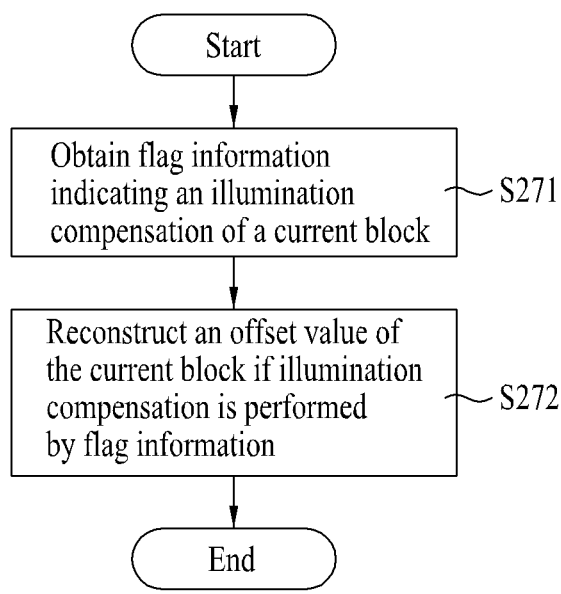
FIG. 16 is a flow chart illustrating a method for performing illumination compensation using not only a flag indicating whether illumination compensation of a current block is performed, but also an offset value of a current block.

FIG. 16 is a flow chart illustrating a method for performing illumination compensation using not only flag information indicating whether illumination compensation of a current block is performed, but also an offset value of the current block.

Referring to FIG. 16, in order to perform illumination compensation, the decoding unit extracts a variety of information from a video signal, for example, flag information and offset values of the current and neighboring blocks of the current block, and index information of reference blocks of the current and neighboring blocks, such that the decoding unit can obtain the predictor of the current block using the above-mentioned extracted information. The decoding unit 50 obtains a residual value between the offset value of the current block and the predictor, and can reconstruct the offset value of the current block using the obtained residual value and the predictor. In the case of reconstructing the offset value of the current block, flag information (IC_flag) indicating whether the illumination compensation of the current block is performed may be used.

The decoding unit obtains flag information indicating whether the illumination compensation of the current block is performed at step S271. If the illumination compensation is performed according to the above-mentioned flag information (IC_flag), the offset value of the current block indicating a difference in average pixel value between the current block and the reference block can be reconstructed at step S272. In this way, the above-mentioned illumination compensation technology encodes a difference value in average pixel value between blocks of different pictures. If a corresponding block is contained in the P slice when the flag indicating whether the illumination compensation is applied to each block, single flag information and a single offset value are encoded/decoded. However, if the corresponding block is contained in the B slice, a variety of methods can be made available, and a detailed description thereof will hereinafter be described with reference to FIGS. 17A-17B.

Figure 17A:
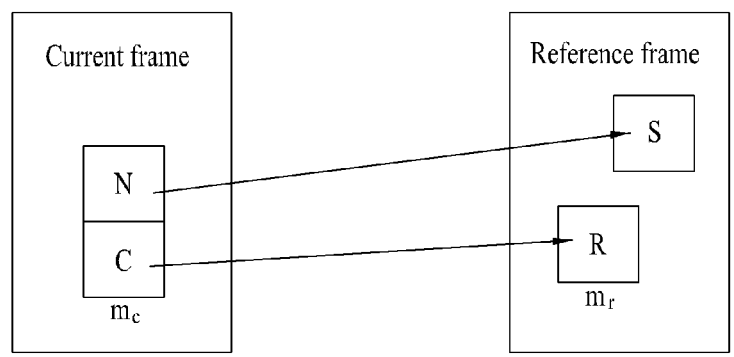
FIGS. 17A-17B are diagrams illustrating a method for performing illumination compensation using a flag and an offset value in association with blocks of P and B slices.
Figure 17B:
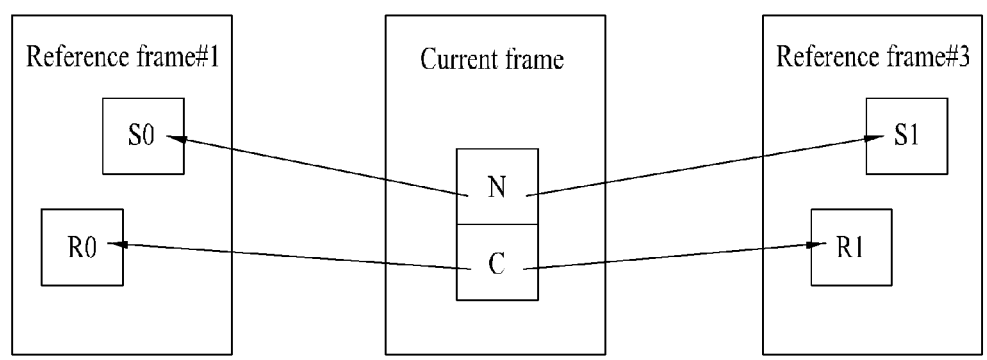

FIGS. 17A-17B are diagrams illustrating a method for performing illumination compensation using flag information and an offset value in association with blocks of P and B slices.

Referring to FIG. 17A, "C" is indicative of a current block, "N" is indicative of a neighboring block of the current block (C), "R" is indicative of a reference block of the current block (C), "S" is indicative of a reference block of the neighboring block (N) of the current block (C), and "$m_c$" is indicative of an average pixel value of the current block (C), "$m_r$" is indicative of an average pixel value of the reference block of the current block (C). If the offset value of the current block (C) is denoted by "IC_offset", the "IC_offset" information can be denoted by "IC_offset=$m_c$−$m_r$".

In this way, if the offset value of the neighboring block (S) is denoted by "IC_offset_pred", the encoding unit can transmit the residual value ($R_{IC\_offset}$) between the offset value (IC_offset) of the current block and the offset value (IC_offset_pred) of the neighboring block to a decoding unit, such that it can reconstruct the offset value "IC_offset" of the current block (C). In this case, the "$R_{IC\_offset}$" information can also be represented by the above-mentioned Equation 20.

In the case of generating the predictor of the current block on the basis of flag information or offset value of the neighboring block, a variety of methods can be made available. For example, information of only one neighboring block may be employed, or information of two or more neighboring blocks may also be employed. In the case of employing the information of two or more neighboring blocks, an average value or a median value may be employed. In this way, if the current block is predictively encoded by a single reference block, the illumination compensation can be performed using a single offset value and single flag information.

However, if the corresponding block is contained in the B slice, i.e., if the current block is predictively encoded by two or more reference blocks, a variety of methods can be made available.

For example, as shown in FIG. 17B, it is assumed that "C" is indicative of a current block, "N" is indicative of a neighboring block of the current block (C), "R0" is indicative of a reference block located at a reference picture (1) of List 0 referred by the current block, "S0" is indicative of a reference block located at the reference picture (1) of List 0 referred by the neighboring block, "R1" is indicative of a reference block located at a reference picture (3) of List 1 referred by the current block, and "S1" is indicative of a reference block located at the reference picture (3) of List 1 referred by the neighboring block. In this case, the flag information and the offset value of the current block are associated with each reference block, such that each reference block includes two values. Therefore, at least one of the flag information and the offset value can be employed respectively.

According to a first example, a predictor of the current block can be obtained by combining information of two reference blocks via the motion compensation. In this case, single flag information indicates whether the illumination compensation of the current block is performed. If the flag information is determined to be "true", a single offset value is obtained from the current block and the predictor, such that the encoding/decoding processes can be performed.

According to a second example, in the motion compensation process, it is determined whether the illumination compensation will be applied to each of two reference blocks. Flag information is assigned to each of the two reference blocks, and a single offset value obtained by using the above-mentioned flag information may be encoded or decoded. In this case, it should be noted that two flag information may be used on the basis of the reference block, and a single offset value may be used on the basis of the current block.

According to a third example, single flag information may indicate whether the illumination compensation will be applied to a corresponding block on the basis of the current block. Individual offset values can be encoded/decoded for two reference blocks. If the illumination compensation is not applied to any one of the reference blocks during the encoding process, a corresponding offset value is set to "0". In this case, single flag information may be used on the basis of the current block, and two offset values may be used on the basis of the reference block.

According to a fourth example, the flag information and the offset value can be encoded/decoded for individual reference blocks. In this case, two flags and two offset values can be used on the bass of the reference block.

According to the above-mentioned first to fourth examples, the offset value is not encoded without any change, and is predicted by an offset value of the neighboring block, such that its residual value is encoded.

Figure 18:
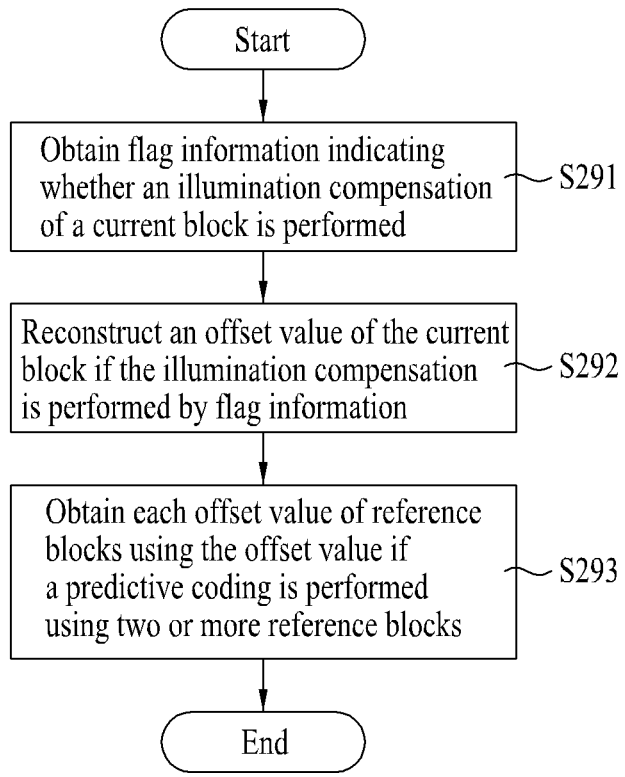
FIG. 18 is a flow chart illustrating a method for performing illumination compensation when a current block is predictively encoded by two or more reference blocks.

FIG. 18 is a flow chart illustrating a method for performing an illumination compensation when a current block is predictively encoded by two or more reference blocks.

Referring to FIG. 18, in order to perform the illumination compensation on the condition that the current block is contained in the B slice, flag information and offset values of the neighboring blocks of the current block are extracted from the video signal, and index information of corresponding reference blocks of the current and neighboring blocks are extracted, such that the predictor of the current block can be obtained by using the extracted information. The decoding unit obtains a residual value between the offset value of the current block and the predictor, and can reconstruct the offset value of the current block using the obtained residual value and the predictor. In the case of reconstructing the offset value of the current block, flag information (IC_flag) indicating whether the illumination compensation of the current block is performed may be used as necessary.

The decoding unit obtains flag information indicating whether the illumination compensation of the current block is performed at step S291. If the illumination compensation is performed according to the above-mentioned flag information (IC_flag), the offset value of the current block indicating a difference in average pixel value between the current block and the reference block can be reconstructed at step S292.

However, if the current block is predictively encoded by two reference blocks, a decoder cannot directly recognize an offset value corresponding to each reference block, because it uses an average pixel value of two reference blocks when obtaining the offset value of the current block. Therefore, according to a first example, an offset value corresponding to each reference is obtained, resulting in the implementation of correct prediction. Therefore, if the current block is predictively encoded by two reference blocks, an offset value corresponding to each reference can be obtained by using the above-mentioned offset value at step S293, as denoted by the following equation 22:

$$IC\_offset = m_c - w_1 \times m_{r,1} - w_2 \times m_{r,2}$$

$$IC\_offsetL0 = m_c - m_{r,1} = IC\_offset + (w_1-1) \times m_{r,1} + w_2 \times m_{r,2}$$

$$IC\_offsetL1 = m_c - m_{r,2} = IC\_offset + w_1 \times m_{r,1} + (w_2-1) \times m_{r,2}$$ [Equation 22]

In Equation 22, $m_c$ is an average pixel value of the current block. $m_{r,1}$ and $m_{r,2}$ are indicative of average pixel values of reference blocks, respectively. $w_1$ and $w_2$ are indicative of weighted coefficients for a bi-predictive coding process, respectively.

In the case of performing the illumination compensation using the above-mentioned method, the system independently obtains an accurate offset value corresponding to each reference block, such that it can more correctly perform the predictive coding process. In the case of reconstructing the offset value of the current block, the system adds the reconstructed residual value and the predictor value, such that it obtains the offset value. In this case, the predictor of List 0 and the predictor of List 1 are obtained and combined, such that the system can obtain a predictor value used for reconstructing the offset value of the current block.

Figure 19:
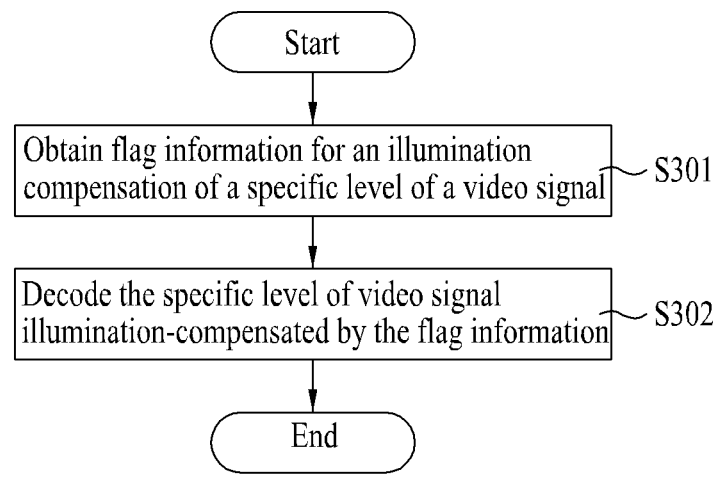
FIG. 19 is a flow chart illustrating a method for performing illumination compensation using a flag indicating whether illumination compensation of a current block is performed.

FIG. 19 is a flow chart illustrating a method for performing an illumination compensation using flag information indicating whether the illumination compensation of a current block is performed.

The illumination compensation technology is adapted to compensate for an illumination difference or a difference in color. If the scope of the illumination compensation technology is extended, the extended illumination compensation technology may also be applied between obtained sequences captured by the same camera. The illumination compensation technology can prevent the difference in illumination or color from greatly affecting the motion estimation. However, indeed, the encoding process employs flag information indicating whether the illumination compensation is performed. The application scope of the illumination compensation may be extended to a sequence, a view, a GOP (Group Of Pictures), a picture, a slice, a macroblock, and a sub-block, etc.

If the illumination compensation technology is applied to a small-sized area, a local area may also be controlled, however, it should be noted that a large number of bits used for the flag information are consumed. The illumination compensation technology may not be required. Therefore, a flag bit indicating whether the illumination compensation is assigned to individual areas, such that the system can effectively use the illumination compensation technology. The system obtains flag information capable of allowing a specific level of the video signal to be illumination-compensated at step S201.

For example, the following flag information may be assigned to individual areas. "seq_IC_flag" information is assigned to a sequence level, "view_IC_flag" information is assigned to a view level, "GOP_IC_flag" information is assigned to a GOP level, "pic_IC_flag" information is assigned to a picture level, "slice_IC_flag" information is assigned to a slice level, "mb_IC_flag" information is assigned to a macroblock level, and "blk_IC_flag" information is assigned to a block level. A detailed description of the above-mentioned flag information will be described with reference to FIGS. 20A-20C. A specific level of the video signal in which the illumination compensation is performed by the flag information can be decoded at step S302.

Figure 20A:
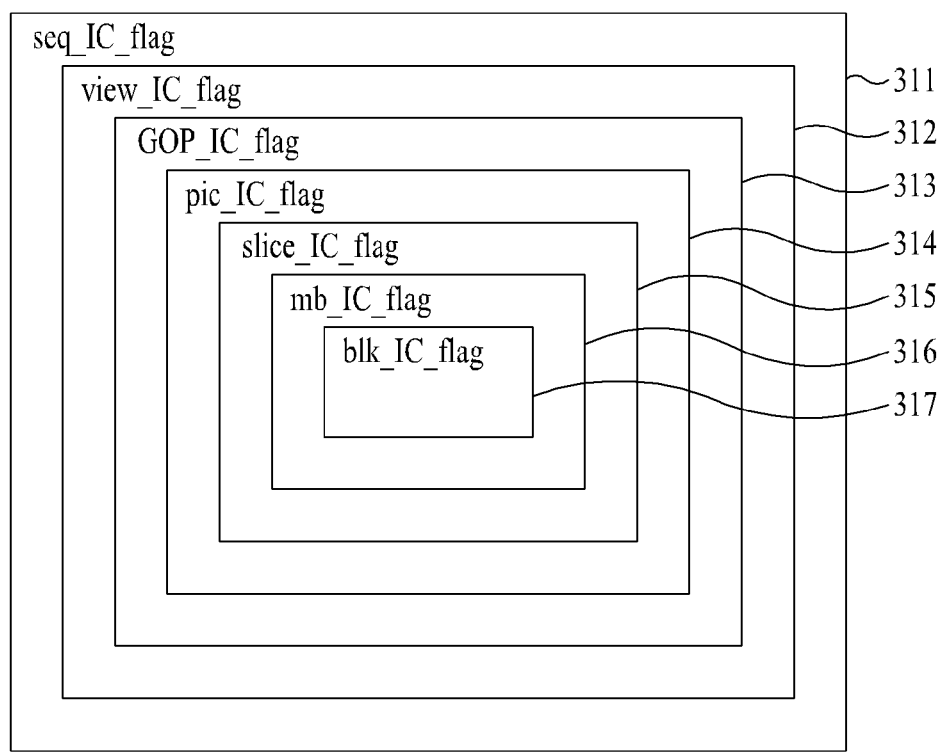
FIGS. 20A-20C are diagrams illustrating the scope of flag information indicating whether illumination compensation of a current block is performed.
Figure 20B:
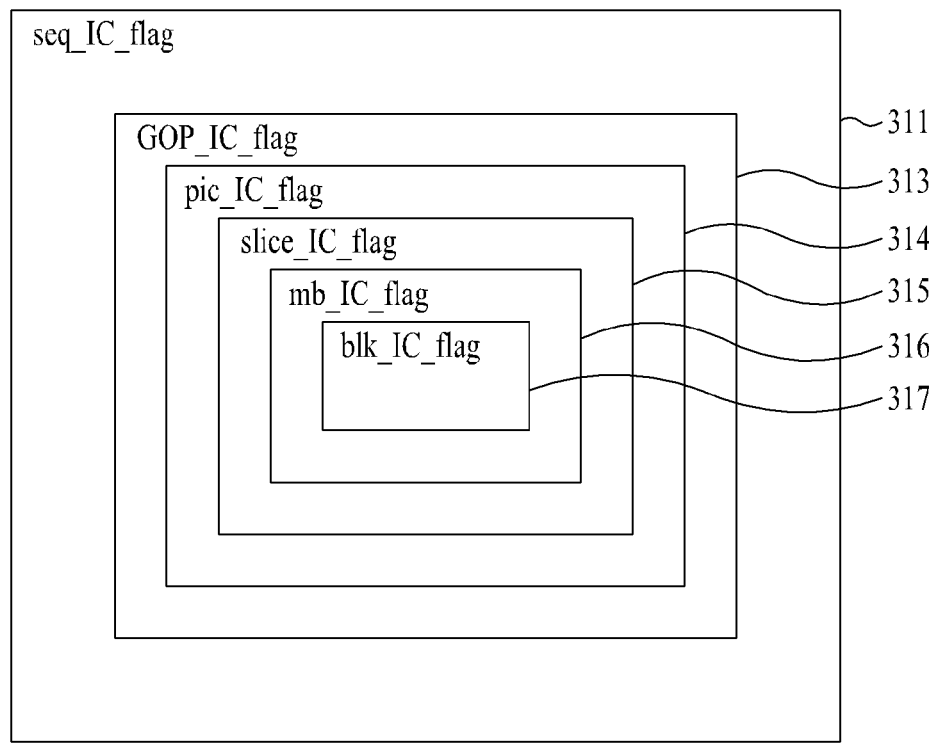
Figure 20C:
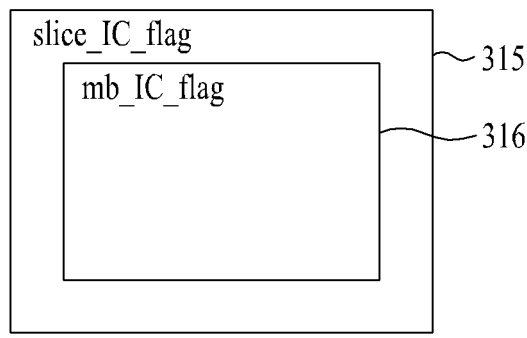

FIGS. 20A-20C are conceptual diagrams illustrating the scope of flag information indicating whether illumination compensation of a current block is performed.

Referring to FIGS. 20A-20C, the flag information indicating whether the illumination compensation is performed can hierarchically be classified. For example, as can be seen from FIGS. 20A-20C, "seq_IC_flag" information 311 is assigned to a sequence level, "view_IC_flag" information 312 is assigned to a view level, "GOP_IC_flag" information 313 is assigned to a GOP level, "pic_IC_flag" information 314 is assigned to a picture level, "slice_IC_flag" information 315 is assigned to a slice level, "mb_IC_flag" information 316 is assigned to a macroblock level, and "blk_IC_flag" information 317 is assigned to a block level.

In this case, each flag is composed of 1 bit. The number of the above-mentioned flags may be set to at least one. The above-mentioned sequence/view/picture/slice-level flags may be located at a corresponding parameter set or header, or may also be located another parameter set. For example, the "seq_IC_flag" information 311 may be located at a sequence parameter set, the "view_IC_flag" information 312 may be located at the view parameter set, the "pic_IC_flag" information 314 may be located at the picture parameter set, and the "slice_IC_flag" information 315 may be located at the slice header.

If two or more flags exist, specific information indicating whether the illumination compensation of an upper level is performed may control whether the illumination compensation of a lower level is performed. In other words, if each flag bit value is set to "1", the illumination compensation technology may be applied to a lower level.

For example, if the "pic_IC_flag" information is set to "1", the "slice_IC_flag" information of each slice contained in a corresponding picture may be set to "1" or "0", the "mb_IC_flag" information of each macroblock may be set to "1" or "0", or the "blk_IC_flag" information of each block may be set to "1" or "0". If the "seq_IC_flag" information is set to "1" on the condition that a view parameter set exists, the "view_IC_flag" value of each view may be set to "1" or "0". Otherwise, the "view_IC_flag" information is set to "1", a flag bit value of GOP, picture, slice, macroblock, or block of a corresponding view may be set to "1" or "0", as shown in FIG. 20A. Needless to say, the above-mentioned flag bit value of GOP, picture, slice, macroblock, or block of the corresponding view may not be set to "1" or "0" as necessary. If the above-mentioned flag bit value of GOP, picture, slice, macroblock, or block of the corresponding view may not be set to "1" or "0", this indicates that the GOP flag, the picture flag, the slice flag, the macroblock flag, or the block flag is not controlled by the view flag information, as shown in FIG. 20B.

If the flag bit value of an upper scope is set to "0", the flag bit values of a lower scope are automatically set to "0". For example, if the "seq_IC_flag" information is set to "0", this indicates that the illumination compensation technology is not applied to a corresponding sequence. Therefore, the "view_IC_flag" information is set to "0", the "GOP_IC_flag" information is set to "0", the "pic_IC_flag" information is set to "0", the "slice_IC_flag" information is set to "0", the "mb_IC_flag" information is set to "0", and the "blk_IC_flag" information is set to "0". If required, only one mb_IC_flag" information or only one "blk_IC_flag" information may be employed according to a specific implementation methods of the illumination compensation technology. If required, the "view_IC_flag" information may be employed when the view parameter set is newly applied to the multiview video coding. The offset value of the current block may be additionally encoded/decoded according to a flag bit value of the macroblock or sub-block acting as the lowest-level unit.

As can be seen from FIG. 20C, the flag indicating the IC technique application may also be applied to both the slice level and macroblock level. For example, if the "slice_IC_flag" information is set to "0", this indicates that the IC technique is not applied to a corresponding slice. If the "slice_IC_flag" information is set to "1", this indicates that the IC technique is applied to a corresponding slice. In this case, if the "mb_IC_flag" information is set to "1", "IC_offset" information of a corresponding macroblock is reconstructed. If the "mb_IC_flag" information is set to "0", this indicates that the IC technique is not applied to a corresponding macroblock.

According to another example, if the flag information of an upper level higher than the macroblock level is determined to be "true", the system can obtain an offset value of a current block indicating a difference in average pixel value between the current block and the reference block. In this case, the flag information of the macroblock level or the flag information of the block level may not be employed as necessary. The illumination compensation technique can indicate whether the illumination compensation of each block is performed using the flag information. The illumination compensation technique may also indicate whether the illumination compensation of each block is performed using a specific value such as a motion vector. The above-mentioned example can also be applied to a variety of applications of the illumination compensation technique. In association with the upper scope (i.e., sequence, view, GOP, and picture), the above-mentioned example can indicate whether the illumination compensation of a lower scope is performed using the flag information. The macroblock or block level acting as the lowest scope can effectively indicate whether the illumination compensation is performed using the offset value without using the flag bit. Similar to the method for use of the motion vector, the predictive coding process can be performed. For example, if the predictive coding process is applied to the current block, the offset value of the neighboring block is assigned to an offset value of the current block. If the predictive coding scheme is determined to be the bi-predictive coding scheme, offset values of individual reference blocks are obtained by the calculation of the reference blocks detected from List 0 and List 1. Therefore, in the case of encoding the offset values of the current block, the offset value of each reference is not directly encoded by the offset values of the neighboring blocks, and a residual value is encoded/decoded. The method for predicting the offset value may be determined to be the above-mentioned offset prediction method or a method for obtaining a median value used for predicting the motion vector. In the case of a direct mode of a bi-directional prediction, supplementary information is not encoded/decoded using the same method as in the motion vector, and the offset values can be obtained by predetermined information.

According to another example, a decoding unit (e.g., H.264-based decoding unit) is used instead of the MVC decoding unit. A view sequence compatible with a conventional decoding unit should be decoded by the conventional decoding unit, such that the "view_IC_flag" information is set to "false" or "0". In this case, there is a need to explain the base-view concept. It should be noted that a single view sequence compatible with the H.264/AVC decoder may be required. Therefore, at least one view, which can be independently decoded, is defined and referred to as a base view. The base view is indicative of a reference view from among several views (i.e., the multiview). A sequence corresponding to the base view in the MVC scheme is encoded by general video encoding schemes (e.g., MPEG-2, MPEG-4, H.263, and H.264, etc.), such that it is generated in the form of an independent bitstream. The above-mentioned base-view sequence can be compatible with the H.264/AVC scheme, or cannot be compatible with the same. However, the view sequence compatible with the H.264/AVC scheme is always set to the base view.

Figure 21:
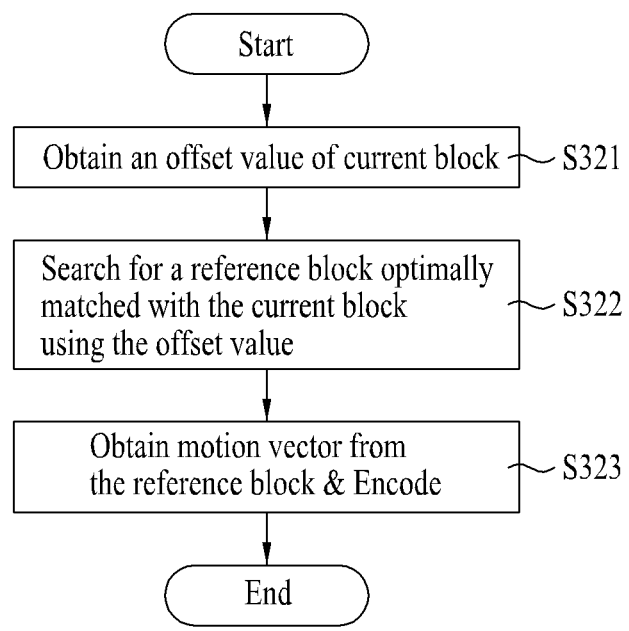
FIG. 21 is a flow chart illustrating a method for obtaining a motion vector considering an offset value of a current block.

FIG. 21 is a flow chart illustrating a method for obtaining a motion vector considering an offset value of a current block.

Referring to FIG. 21, the system can obtain an offset value of the current block at step S321. The system searches for a reference block optimally matched with the current block using the offset value at step S322. The system obtains the motion vector from the reference block, and encodes the motion vector at step S323. For the illumination compensation, a variety of factors are considered during the motion estimation. For example, in the case of a method for comparing a first block with a second block by offsetting average pixel values of the first and second blocks, average pixel values of the two blocks are deducted from pixel values of each block during the motion estimation, such that the similarity between the two blocks can be calculated. In this case, the offset value between the two blocks is independently encoded, such that the costs for the independent encoding are reflected in the motion estimation process. The conventional costs can be calculated by the following equation 23:

$$COST = SAD + \lambda_{MOTION} \cdot GenBit \qquad [\text{Equation 23}]$$

In the case of using the illumination compensation, the SAD (Sum of Absolute Differences) can be represented by the following equation 24:

$$SAD = \sum_{ij} |(I_c(m,n) - M_c) - (I_r(m,n) - M_r)| \qquad [\text{Equation 24}]$$

In equation 24, $I_c$ is indicative of a pixel value of the current block, and $I_r$ is indicative of a pixel value of the reference block. $M_c$ is indicative of an average pixel value of the current block, and $M_r$ is indicative of an average pixel value of the reference block. The offset costs can be included in the above-mentioned SAD calculation process, as denoted by the following equations 25 and 26:

$$COST_{IC} = SAD_{IC} + \lambda_{MOTION} \cdot GenBit \qquad [\text{Equation 25}]$$

$$SAD_{IC} = \alpha|\text{offset} - \text{offset\_pred}| + \Sigma|(I_c(m,n) - M_c) - (I_r(m,n) - M_r)| \qquad [\text{Equation 26}]$$

With reference to Equations 25 and 26, $\alpha$ is indicative of a weighted coefficient. If the value of $\alpha$ is set to "1", the absolute value of the offset value is reflected. For another method for reflecting the illumination compensation cost, there is a method for reflecting the illumination compensation cost by predicting the number of bits required for encoding the offset value. The following equation 27 represents a method for predicting the offset coding bit. In this case, the coding bit can be predicted in proportion to the magnitude of an offset residual value.

$$GenBit_{IC} = GenBit + Bit_{IC} \qquad [\text{Equation 27}]$$

In this case, a new cost can be calculated by the following equation 28:

$$Cost = SAD + \lambda_{MOTION} \cdot GenBit_{IC} \qquad [\text{Equation 28}]$$

What is claimed is:

1. A method for decoding multi-view video data in a multi-view video data stream, comprising:
   obtaining, by a decoding apparatus, inter-view prediction structure information from a sequence header in the multi-view video data stream,
   the inter-view prediction structure information including number information and view identification information of a random access picture, the number information indicating a total number of views in the multi-view video data, the view identification information providing a view identifier of each reference view in the multi-view video data,
   all slices in the random access picture referring only slices having a same temporal position and being in a different view of the multi-view video data;
   determining, by the decoding apparatus, a reference picture list of a current slice for inter-view prediction using the view identification information of the random access picture;
   determining, by the decoding apparatus, a prediction value of a macroblock in the current slice based on the determined reference picture list for inter-view prediction; and
   decoding, by the decoding apparatus, the macroblock in the current slice using the prediction value,
   wherein the multi-view video data includes video data of a base view and an ancillary view, the base view indicating a view being decoded independently of other views without using inter-view prediction, the ancillary view being a view other than the base view.

2. The method of claim 1, wherein the view identification information of the random access picture is obtained by considering a predictive direction.

3. The method of claim 2, wherein the predictive direction represents a forward direction or a backward direction in an output order of pictures.

4. The method of claim 1, wherein the ancillary view is decoded by referring to the base view.

5. An apparatus for decoding multi-view video data in a multi-view video data stream, comprising:
   a Network Abstraction Layer parsing unit for obtaining inter-view prediction structure information from a sequence header in the multi-view video data stream,
   the inter-view prediction structure information including number information and view identification information of a random access picture, the number information indicating a total number of views in the multi-view video data, the view identification information providing a view identifier of each reference view in the multi-view video data, all slices in the random access picture referring only slices having a same temporal position and being in a different view of the multi-view video data;

a decoded picture buffer unit for determining a reference picture list of a current slice for inter-view prediction using the view identification information of the random access picture; and an inter-prediction unit for determining a prediction value of a macroblock in the current slice based on the determined reference picture list for inter-view prediction, and decoding the macroblock in the current slice using the prediction value, wherein the multi-view video data includes video data of a base view and an ancillary view, the base view indicating a view being decoded independently of other views without using inter-view prediction, the ancillary view being a view other than the base view.

6. The apparatus of claim 5, wherein the view identification information of the random access picture is obtained by considering a predictive direction.

7. The apparatus of claim 6, wherein the predictive direction represents a forward direction and a backward direction in an output order of pictures.

8. The apparatus of claim 5, wherein the ancillary view is decoded by referring to the base view.

* * * * *